Fig. 2.

April 25, 1944.  R. ANSCHUTZ  2,347,235
BOOKKEEPING MACHINE
Filed June 7, 1937  15 Sheets-Sheet 5

April 25, 1944.   R. ANSCHUTZ   2,347,235
BOOKKEEPING MACHINE
Filed June 7, 1937   15 Sheets-Sheet 6

April 25, 1944.   R. ANSCHUTZ   2,347,235
BOOKKEEPING MACHINE
Filed June 7, 1937   15 Sheets-Sheet 7

R. Anschütz
INVENTOR
By: Glascock Downing & Seebold
Attys.

April 25, 1944.  R. ANSCHUTZ  2,347,235
BOOKKEEPING MACHINE
Filed June 7, 1937  15 Sheets-Sheet 8

R. Anschütz
INVENTOR
By: Glascock Downing Seebald
Attys

April 25, 1944.   R. ANSCHUTZ   2,347,235
BOOKKEEPING MACHINE
Filed June 7, 1937    15 Sheets-Sheet 9
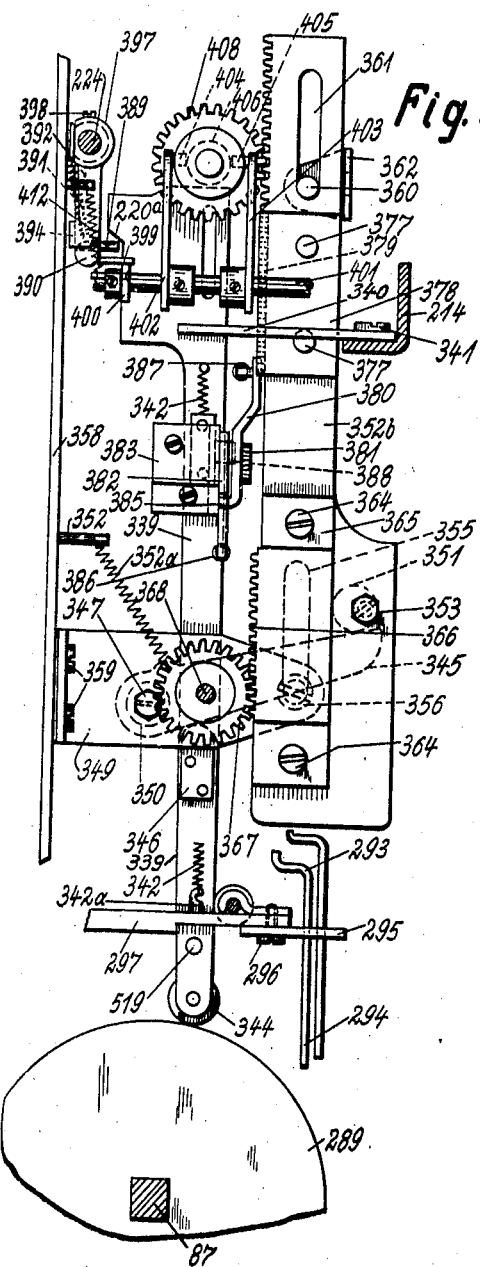
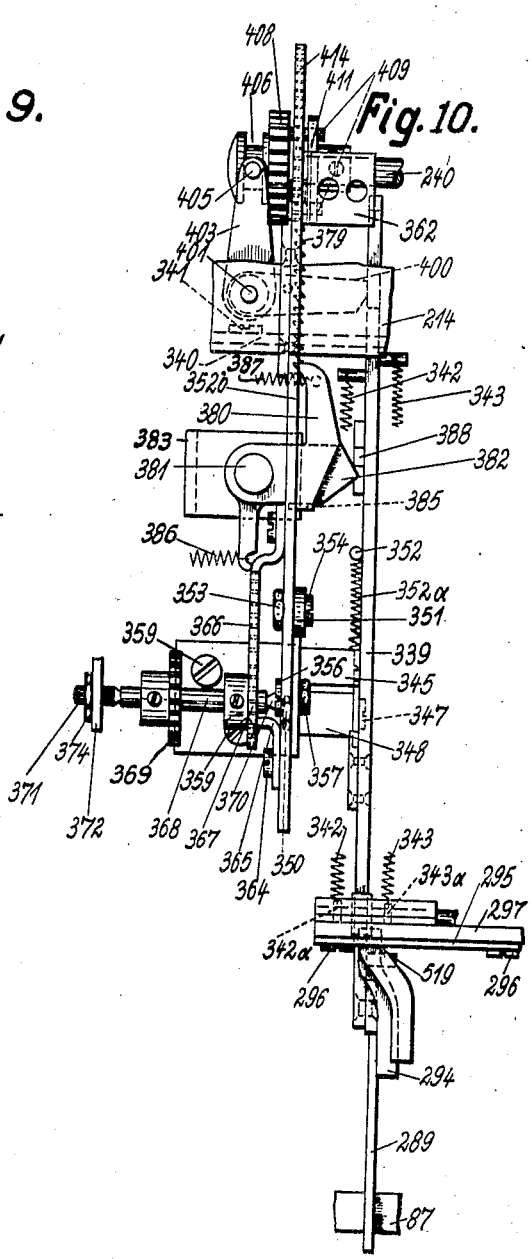
R. Anschütz
INVENTOR
By Glascock Downing & Seebold
Attys.

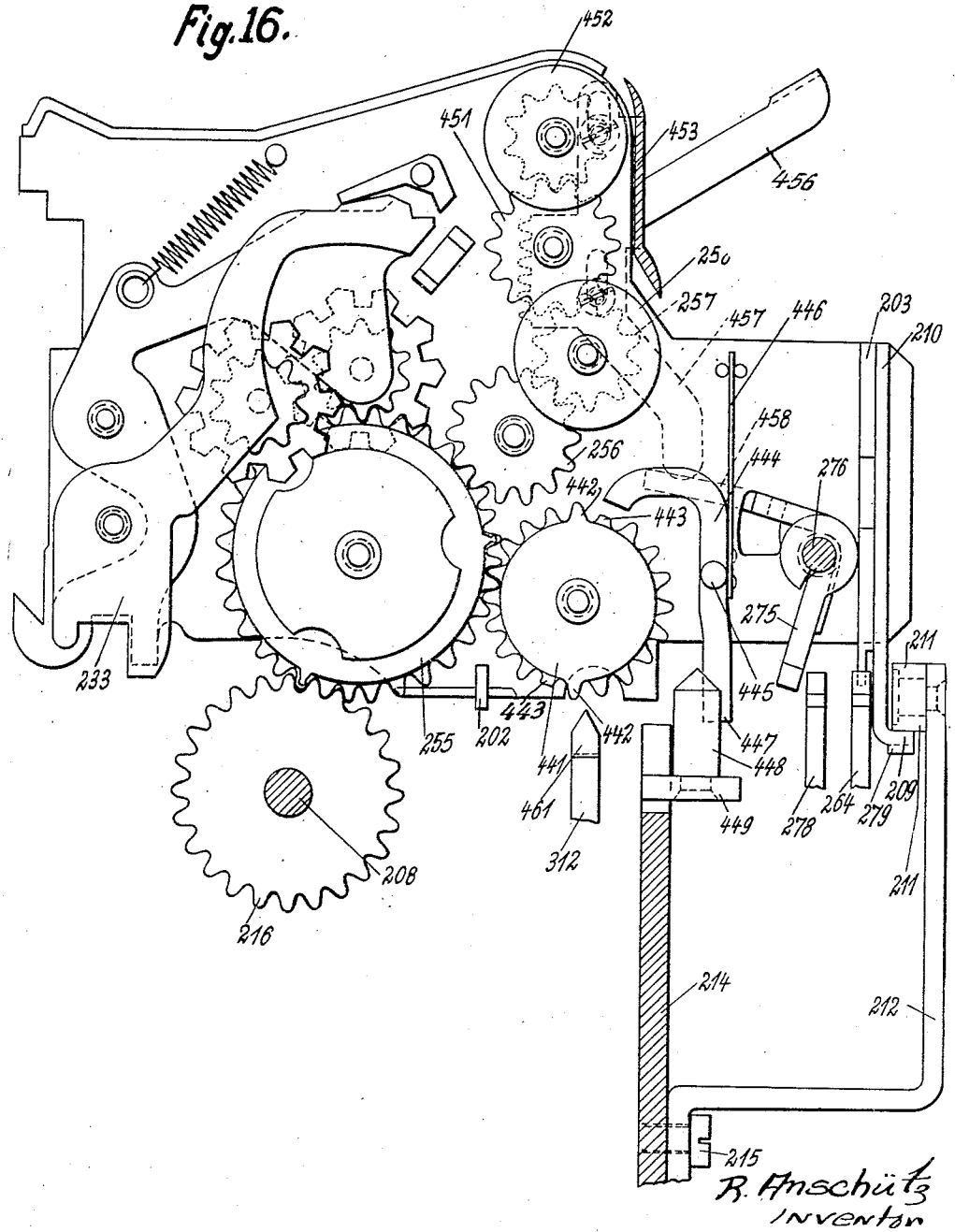

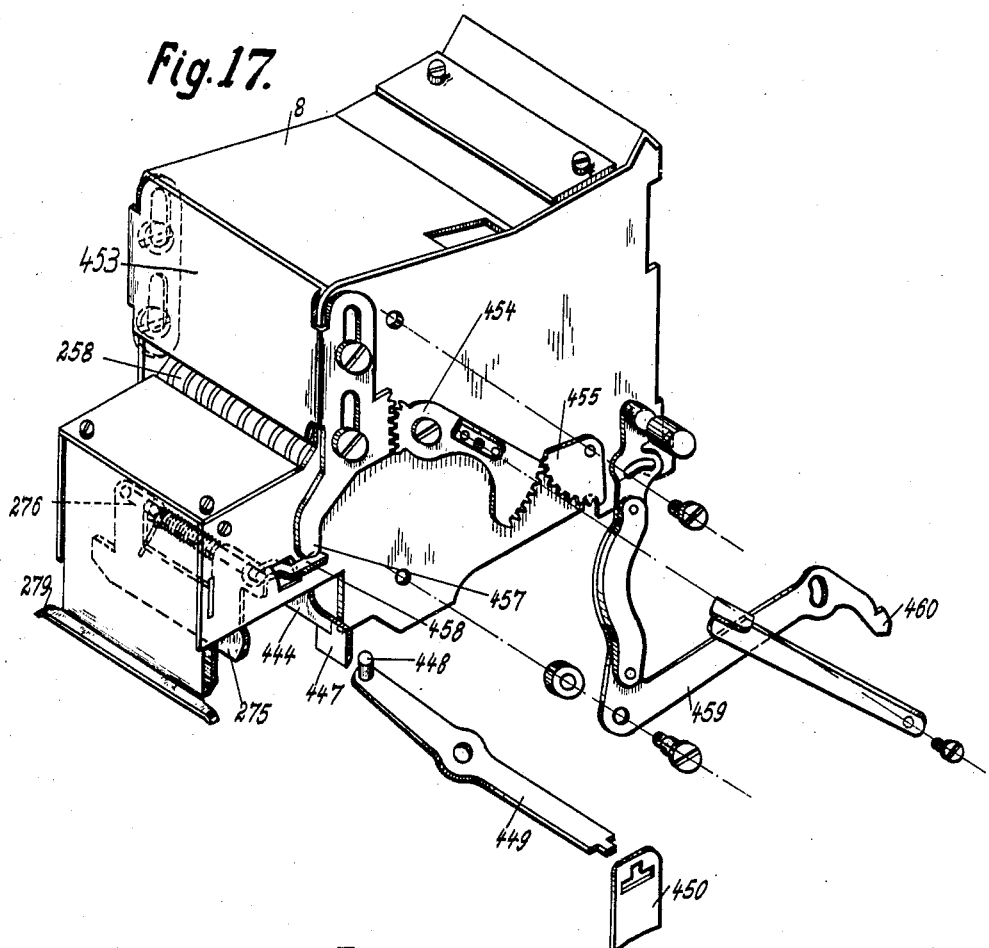

Patented Apr. 25, 1944

2,347,235

UNITED STATES PATENT OFFICE 2,347,235

BOOKKEEPING MACHINE

Robert Anschütz, Zella-Mehlis, Thuringia, Germany; vested in the Alien Property Custodian Application June 7, 1937, Serial No. 146,897
In Germany June 12, 1936

16 Claims. (Cl. 235—59)

The invention relates to bookkeeping machines, especially for typewriting calculating machines equipped with a total taking mechanism for the automatic clear writing of column and cross totalizers by decimal places.

Such mechanisms have previously been known. However, the known devices had the disadvantage that the cam shaft for actuating the numeral keys was swingably arranged whereby the drive of the cam shaft was rendered difficult and the reliability impaired.

According to the invention this drawback is now obviated by fixedly mounting the cam shaft and by arranging, between the cam shaft and the numeral key levers, a swingable frame which can be coupled to a driving member and is provided with setting members movable into the path of the cams and number key levers.

In the drawings an embodiment of the invention is shown by way of example.

Fig. 2 shows a plan view of the machine shown in Fig. 1, illustrating the front part of the machine only;

Figure 7:
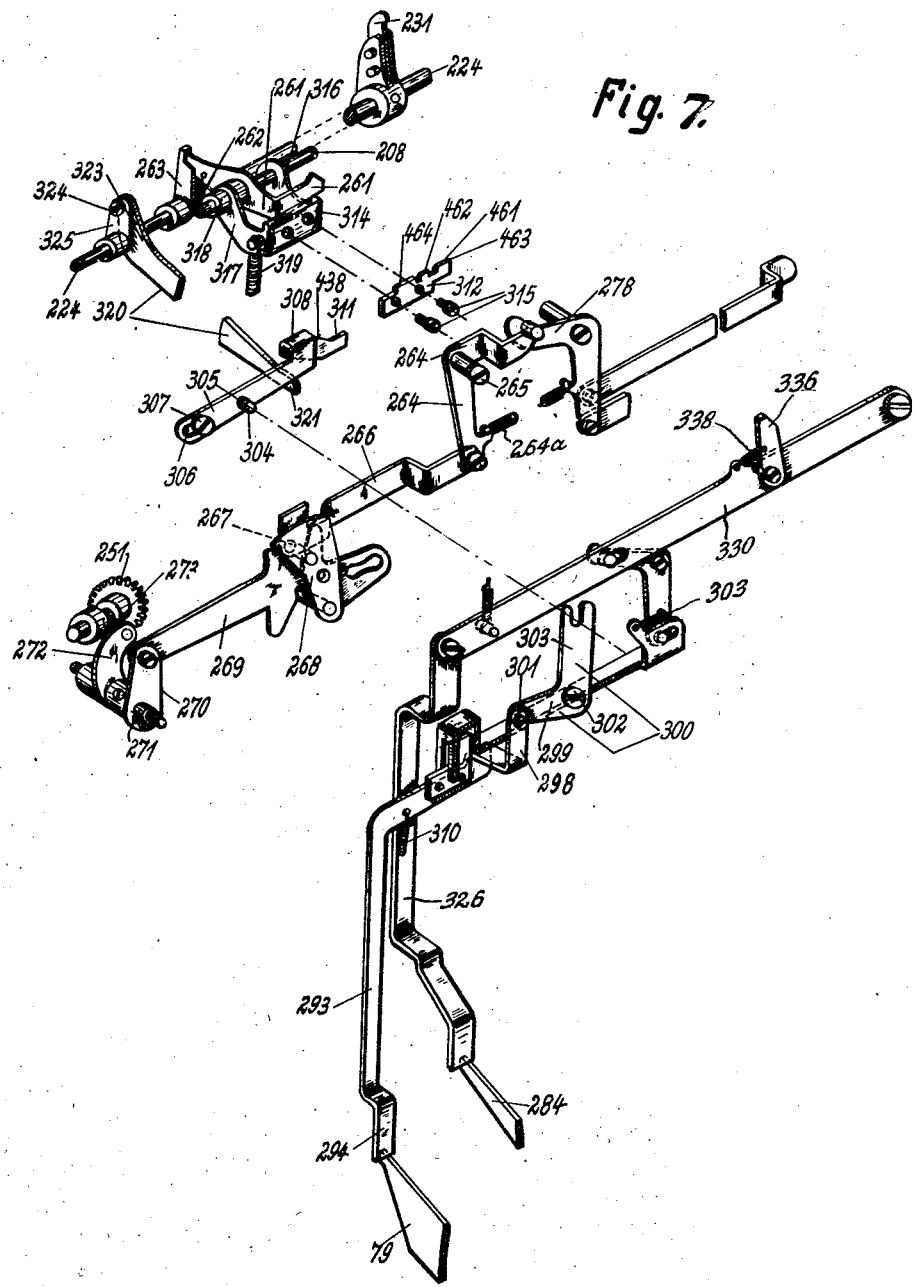
Figure 8:
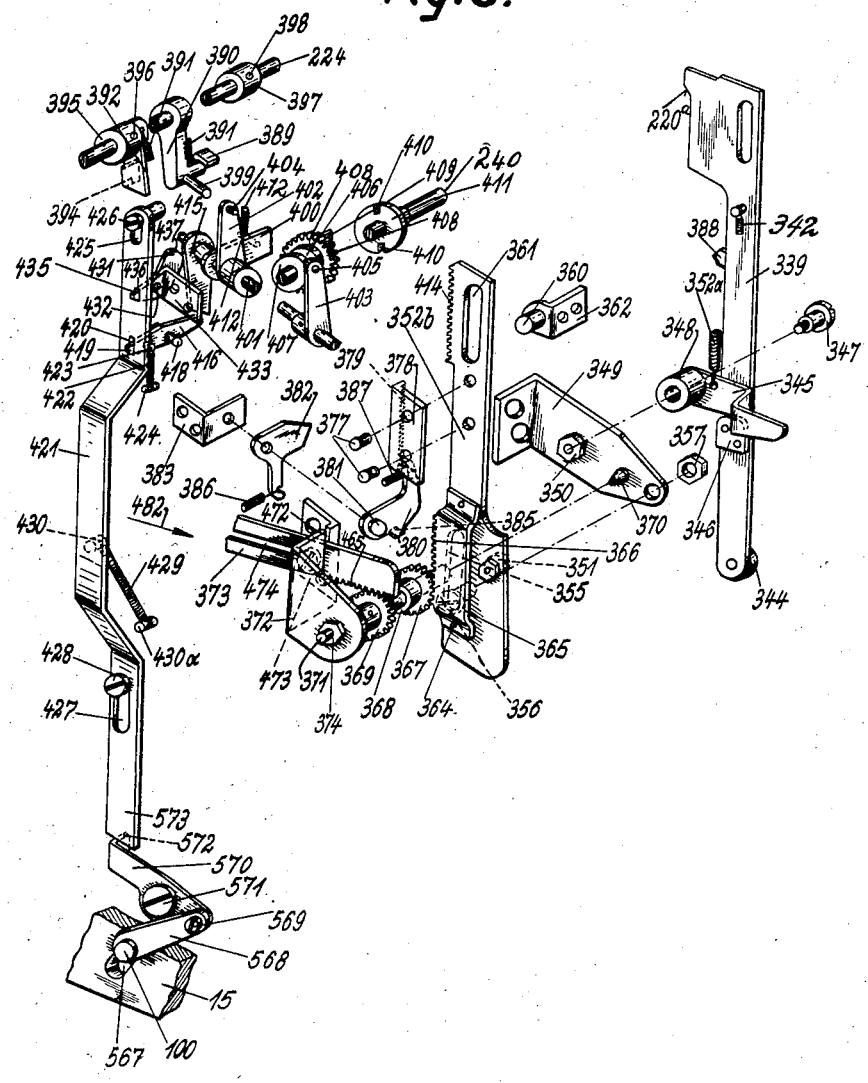

Fig. 7 shows in a perspective view details of the control mechanism of the calculating mechanism for automatic total-taking, also viewed from left-hand side of the machine, sundry parts drawn out from one another or broken away for better comprehension, Fig. 8 shows further control and driving members of the calculating mechanism for automatic total-taking also in perspective viewed from the front left-hand side, said parts drawn out from one another or broken away for better illustration.

Figure 11:
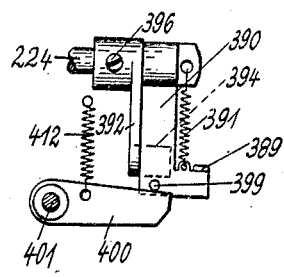
Figure 12:
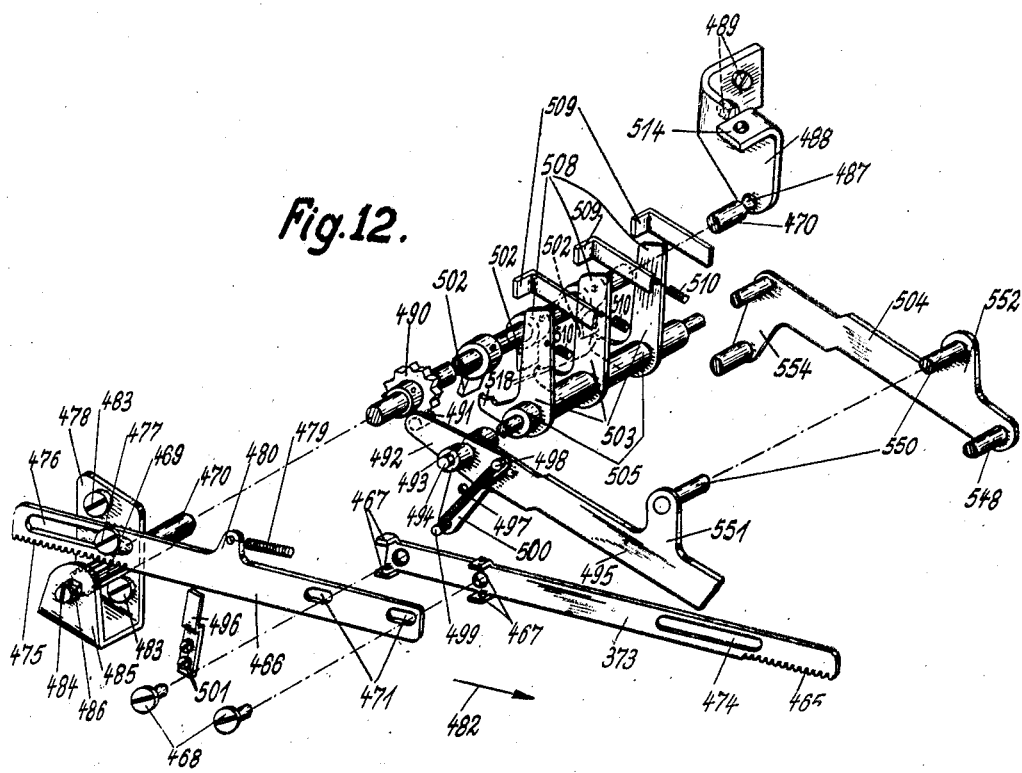
Figure 13:
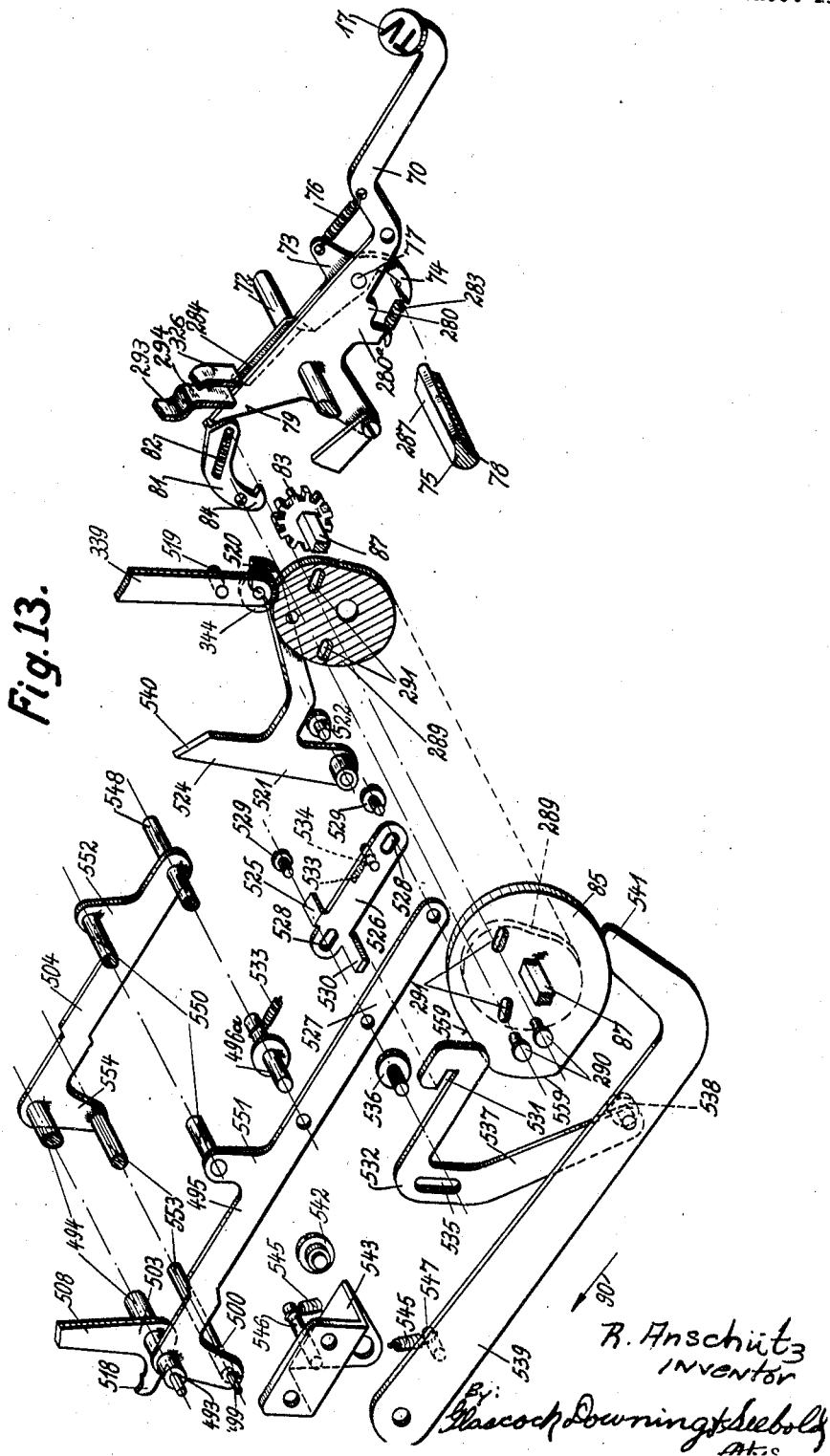
Figure 14:
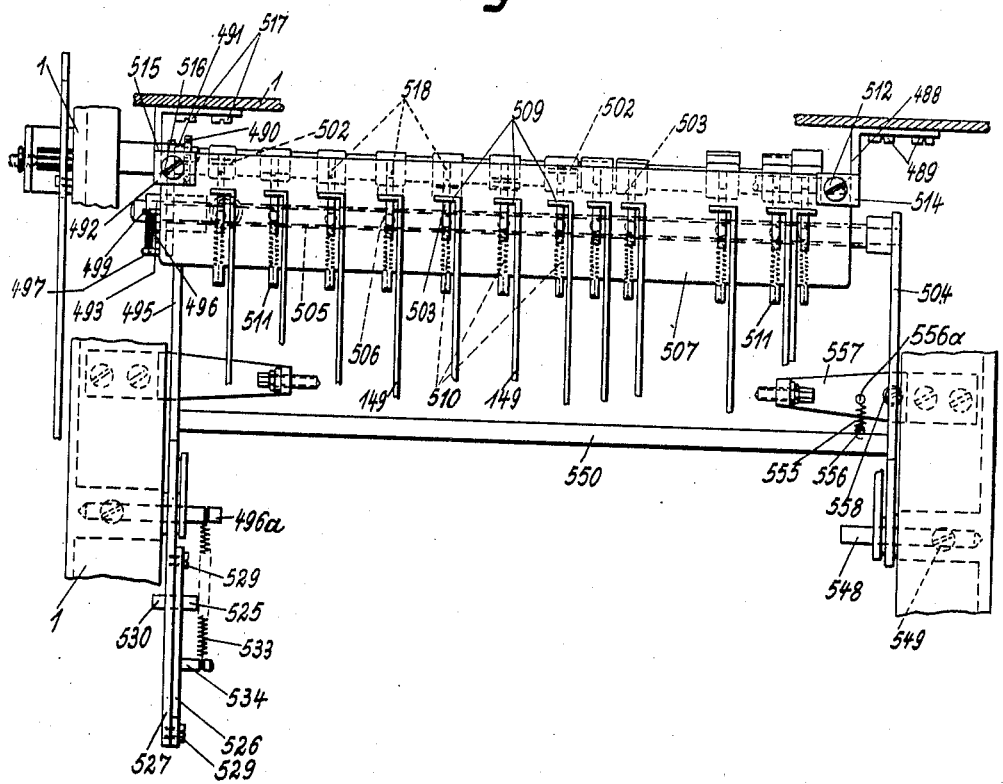
Figure 15:
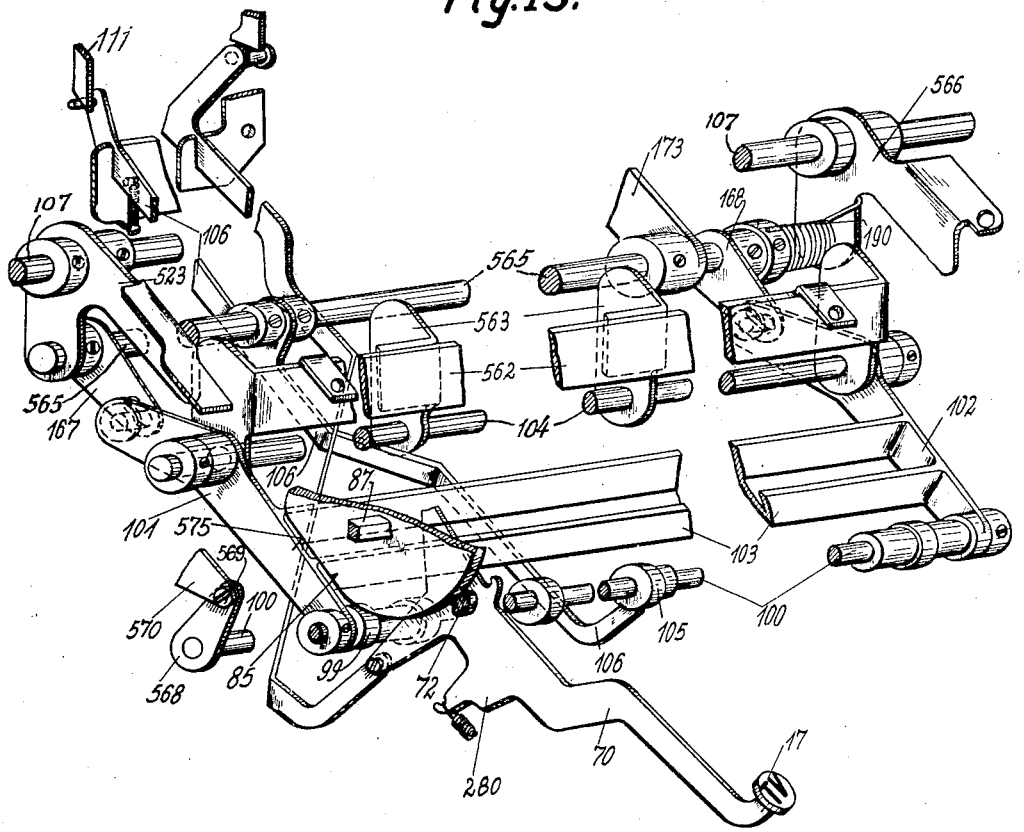

Fig. 9 is a side elevation of the principal parts according to Fig. 8;

Fig. 10 shows a front elevation of the parts according to Fig. 9;

Fig. 11 shows also a front elevation of a detail of Fig. 10;

Fig. 12 shows in perspective, also viewed from the front left-hand side, the preparatory and control members for the typewriting mechanism, some of which are represented drawn-out from one another or broken away for better illustration;

Fig. 13 shows further coupling and operative members for the typewriting mechanism also in perspective viewed from the front left-hand side, some of which are shown drawn-out from one another or broken away;

Fig. 14 is a plan of the parts according to Figs. 12 and 13;

Fig. 15 shows further mechanism substantially known, which are operated in automatic total-taking, in perspective viewed from the front left-hand side, some of said parts shown broken away;

Fig. 16 shows a left-hand side elevation of a complement totalizer, the left-hand side of the housing removed to expose the parts of the driving gear;

Fig. 17 is a perspective representation of the complement totalizer according to Fig. 16, viewed from the front right-hand side;

Fig. 18 is a diagrammatic representation of part of a form on which booking entries are recorded by way of example which are booked by means of the machine according to the invention.

General description of the machine

The principal parts of the machine are the machine frame 1 (Figs. 2, 3 and 4) a paper carriage 2 displaceably attached to carriage running rails 3 and 4 fixed to the machine frame, and totalizers 5 and 6, an idle totalizer 7 and a complement totalizer 8 (Figs. 1 and 3), provided for a definite booking operation and attached to a suspension rail 9 fixed to the paper carriage 2. The machine is further provided with a casing 10 carrying the calculating elements and being fixed to the front side of the machine frame 1. In the machine frame 1 a typewriter keyboard 11 is arranged with shift keys 12 and a carriage return key 13 (Figs. 1 and 2) for controlling the carriage return mechanism. Also keys 14 of a decimal tabulator have been provided in the machine frame 1. A carrying frame 15 (Figs. 1, 3 and 5) constitutes a further part of the machine, and in this frame 15 are provided calculating keys 16 (Figs. 1, 2 and 4), a total-taking key 17, and elements associated thereto. A motor 18 (Figs. 1, 2) fixed to the right-hand side of the machine frame drives the actuating cams, the typing mechanisms and the carriage return mechanism through a suitable gearing.

*Normal calculating and typing operation taking place when making booking entries in the columns I to III of the form*

To this end the totalizers 5 to 8 corresponding to the column I to IV of form 200 (Fig. 18) are suspended from the suspension rail 9 for the totalizers (Figs. 1 to 3) and the tabulator stops 37 (Figs. 3 and 4) associated therewith are adjusted or set on the bar or shaft 115. The form 200 is also properly adjusted around the platen and set to writing position with respect to the first writing line. By actuating carriage release lever 201 the paper carriage 2 is then moved into the extreme right-hand position.

In order to effect the booking entries in columns I to III on the first writing line of form 200, it is necessary to bring the paper carriage 2 with the totalizers 5 to 7 or the columns I to III of form 200, respectively, into the respective required working or operating position. This is effected by depressing the tabulator key corresponding to the value to be booked, of the decimal tabulator keys 14, whereby the paper carriage 2 is released for a movement to the left, which is stopped at the required position by the cooperation of the corresponding tabulator stop 37 and the tabulator slide 22 (Figs. 3 and 4) associated with the depressed tabulator key.

When running into the selected operating positions, the totalizers act, as the case may be, by means of control plates 202, 203 and 204 (Fig. 4) on controlling members 261, 264, 278 (Figs. 7 and 2), thereby effecting, in a manner to be hereinafter described under the heading "Total taking process in the calculating mechanism," the release of the calculating mechanism, the adjustment of the particular species of calculation and the actuation of a coupling sleeve 205 (Fig. 2) for selective coupling of the calculating mechanism driving wheels 206 and 207 with the driving shaft 208 (Figs. 2 and 6), on which shaft 208 said driving wheels 206 and 207 are rotatable, but not shiftable axially. In the same manner the totalizers, when moving into operating position, will slide the forwardly extending flanges 209 of the guide plates 210 fixed to them, below a roller 211 (Figs. 2, 4 and 16) rotatably fixed to an angle shaped guiding member 212 screwed to the front side 214 of the casing 10 by means of screws 215. When moving into their operating position, the guiding plates 210 act also on members hereinafter described under the heading "Total-taking process in the calculating mechanism" without actuating, however, any further mechanism. Further, when moving into their operating position, the totalizers are caused to selectively engage, according to the respective operating position, with the driving or master wheels 216 and 217 (Figs. 2 and 6) fixedly arranged on the shaft 203 and with the driving wheels 206 and 207 adapted to be coupled selectively to the shaft 208.

Figure 6:
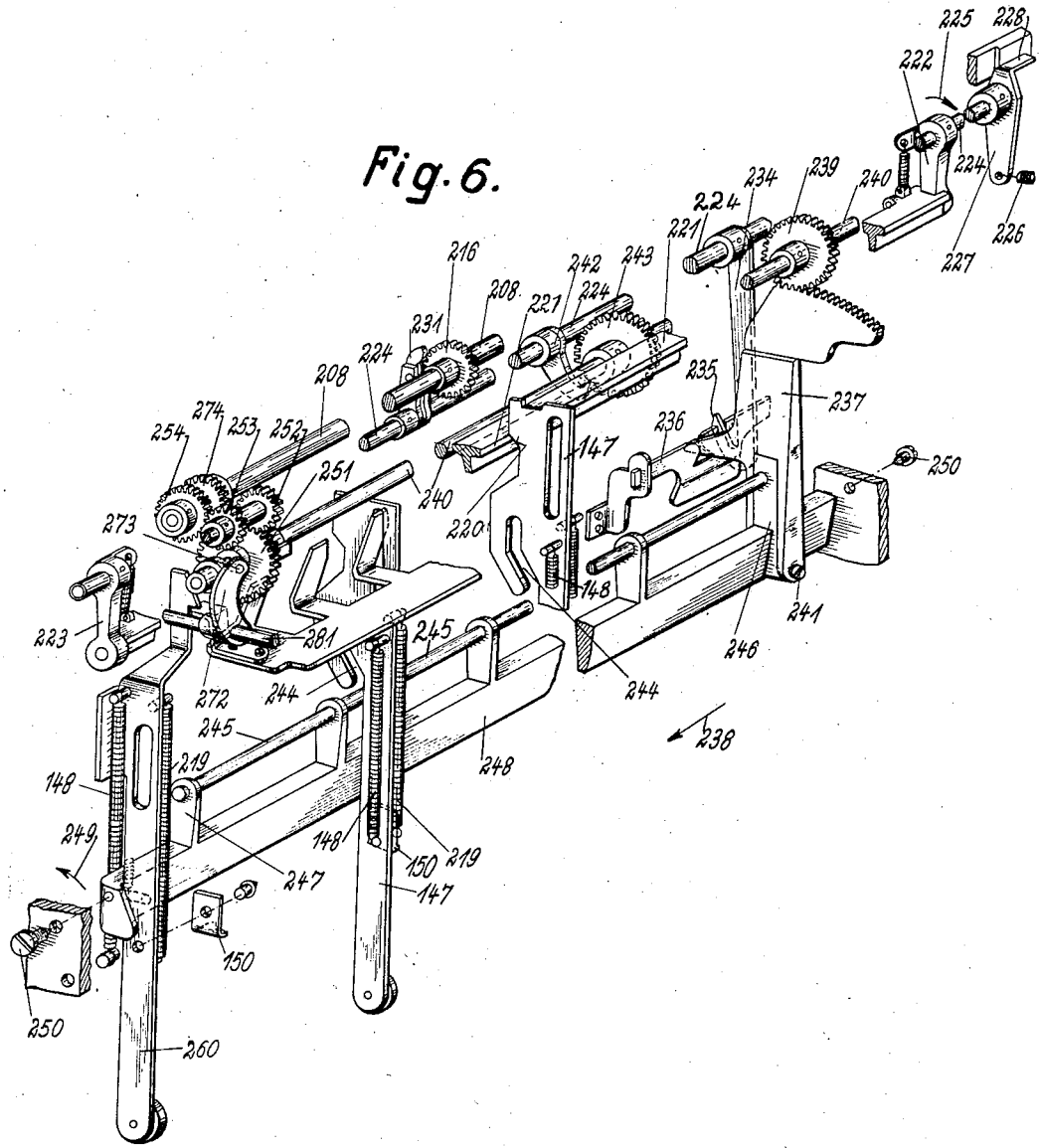
Fig. 6 shows a perspective view viewed from the front left-hand side of the machine, of a part of the known driving members of the calculating mechanism, in which for the sake of better comprehension some of the parts are represented drawn out from one another and other parts are shown broken away.

For the purpose of calculating and writing down the values to be booked, the respective calculating keys 16 are depressed successively and with every depressed key the following operations will be started. If, for instance, the calculating key corresponding to the numeral "1" of the value "153.42" to be booked first, is depressed, the associated key lever 218 is swung around its shaft 72, whereby in turn the cam 143 associated with the swingable key lever 218 is coupled for one rotation to the shaft 87 driven continuously by the motor 18. During the first half rotation of the cam 143 now taking place, the differential member 147 (Figs. 4 and 6), which is always held against the cam 143 by means of springs 148 and 219, will follow the descending cam slope under action of the said springs. In consequence, the differential member 147 is caused to make a downward movement, at the beginning of which the inclined face 220 (Figs. 4 and 6) of the slide acts on the ledge 221 of the swinging frame 221, 222, 223, fast on the shaft 224 and causes the frame and shaft to swing in the direction of arrow 225 against action of spring 226 bearing upon lever 227 fast on shaft 224. The spring 226 continually pulls the bent-off portion 228 (Fig. 2) of lever 227 against the backwall of the casing 10 thus determining the normal position of shaft 224 and of the parts or elements mounted thereon. When the swinging frame 221, 222, 223, 224 swings as above indicated, the levers 229, 230, 231 and 232 (Figs. 2, 6) associated with the driving or master wheels 206, 207, 216 and 217 and fixed on shaft 224 are also caused to swing and in turn act on the release levers 233 of the totalizers (Fig. 16), which are in operating position at such times with respect to the levers 229, 230, 231 and 232. These respective release levers, according to the exemplified first booking operation, are the release levers 233 of the hundreds places of the totalizers 5 and 6 and of the complement totalizer 8. Since the values are only written down in column III, but not calculated or entered in the totalizer 7, this has been designed as an idle totalizer and has, therefore, no driving parts or gear, so that in this operation the lever 230 of the swinging frame 221, 222, 223, 224, swings in idle motion without acting on any totalizer release lever. The lever 234 (Fig. 6) also fast on the shaft 224 of the swinging frame 221, 222, 223, 224 acts during the swinging movement referred to, by its laterally bent cam portion 235 on the slide 236 in driving connection with the driving segment or sector 237, displacing it in the direction of the arrow 238 (Fig. 6). In consequence, the driving segment 237, which in its normal position is held out of engagement with the driving wheel 239 fast on shaft 240, by the cam portion 235, is swung around its pivot screw 241 so that it is caused to engage the driving wheel 239. The lever 242 also fast on shaft 224 is swung in the same direction as the levers 229 to 232, whereby the lever 242 disengages the ratchet wheel 243, thus releasing the gear system of the calculating mechanism. During its further downward movement the differential member 147 co-acts, by means of its differential cam slot 244 (Figs. 4 and 6) with the shaft 245 of the swinging frame 245, 246, 247, 248, to the beam 248 of which the driving segment 237 is mounted to swing laterally around the screw 241. The swinging frame 245, 246, 247, 248 is thus swung in the direction of arrow 249 (Fig. 6) around the pivot screws 250 and the driving segment 237 which is in a fixed relation to the swing frame 245, 246, 247, 248 in this direction of movement, partakes of this swinging movement. Due to the driving connection 237, 239 previously made, this movement is transmitted to the shaft 240 and by way of the driving elements 251, 252, 253 and 254 to the master wheel driving shaft 208. By means of the driving wheels 216 and 217 fast on shaft 208 this movement is also transmitted to the main wheels 255 (Figs. 3, 4 and 16) of the totalizer 5 and of the complement totalizer 8, which in turn transmit this movement by way of the totalizer intermediate gears 256 and 257 (Fig. 16) to the numeral wheels 258. Now, the numeral "1" is shown in the hundreds places of the totalizers 5 and 8 on their numeral wheels 258. No transmission by the driving wheels 206 and 207 to the totalizers 6 and 7 has been effected in this case, because in the first booking operation the coupling of these driving wheels has been controlled in such a manner, that the driving wheel 206 is out of, and the driving wheel 207 is in driving connection with the shaft 208. Accordingly, the driving wheel 206 and the driving elements of the totalizer 6 are not acted upon. The driving wheel 207, though taking part in this movement, does not transmit its movement to the idle totalizer 7, since this has no driving elements, the idle totalizer 7 being fitted only with the controlling members for controlling the calculating mechanism release and the members for setting the species of calculation. Shortly before the differential member 147 has finished its downward movement, it co-acts, by means of the angle piece 150 fast on it (Figs. 4 and 6), with its associated numeral writing key lever 149 for the numeral "1" and causes it to swing in a clockwise direction around the pivot bar 259. By means of the intermediate member 151 the driving connection is consequently established between the lever system 151, 155 of the type lever 154 and the fluted shaft 153 continually driven by means of the motor 18 and the type lever for typing the "1" of the value "153.42" in column I of the form 200 (Fig. 18) is operated. When the type lever printing the type falls back, the carriage escapement control mechanism (not shown in the drawings) is acted upon and the paper carriage is released for a movement to the left by one step. For the purpose of effecting the stepwise transport of the carriage 2 in the comma place, the comma place is bridged over by actuating the space key 130 or by a comma skipping device.

During the second half rotation of the cam 143 its nose acts on the differential member 147 and displaces it against action of springs 148 and 219 upwards into its normal position. Hereby all mechanisms actuated are caused to return to their normal positions under action of their associated springs.

With each depression of a calculating key of the calculating keys 16 for the purpose of booking operations to be performed in columns I to II, the above described operations will be repeated. The differential member 260 (Fig. 6) corresponding to number "0" has not been provided with an inclined face 220 for controlling the release of the calculating mechanism nor with a differential slot 244, because no differential operation has to be effected by this member. It is merely provided with an angle piece 150 to actuate the key lever for typing the "0." The booking entries to be made in column III of the form 200 are recorded on the form, but are not indicated in the idle totalizer 7. In order to indicate if in column III a negative balance is booked, as is the case for instance with the value "302.85," this previous negative balance is written down in inclined numerals.

In the various booking operations the state control mechanism is always controlled in such a manner that each of the booking entries in the columns I to III is transmitted to the complement totalizer additively or subtractively according to whether a credit or debit item or sum, or a debit or credit balance, respectively, is booked. The new balances thus entered or calculated in the complement totalizer 8 are now written out or withdrawn from the complement totalizer 8 by automatic total-taking and are written down in column IV of form 200 for which purpose the following mechanisms are provided and put into operation.

*Automatic total-taking*

The values shown in the complement totalizer 8, which have been calculated from the values booked in the columns I to III, are now to be written out or withdrawn from the totalizer 8 by means of automatic total-taking and recorded in column IV. To this end it may be assumed that first the value "417.95" is to be withdrawn from the complement totalizer 8 and written down on the first booking line in column IV of the form 200. Since the value "417.95" represents a new debit balance, that is a value introduced by addition into the complement totalizer 8, it must be withdrawn from the said totalizer by subtraction. To place the paper carriage 2 into the required position, the hundreds tabulator key 14 of the decimal tabulator corresponding to the value "417.95" is depressed, whereby the tabulator key lever 20 (Fig. 4) associated with this lever is swung in a clockwise direction around its pivot screw 21 and the tabulator rod 22 associated with lever 20 is raised. In doing so, the tabulator rod 22 renders the carriage stop lock ineffective. Consequently, the paper carriage 2 is displaced to the left-hand side by the carriage spring, this movement being limited by the tabulator stop 37 associated with the complement totalizer 8 striking against the said tabulator slide 22. In this position the hundreds wheel of the complement totalizer 8 (Figs. 3 and 16) is in engagement with the driving wheel 216 of the calculating mechanism, while column IV of the form 200 is in writing position.

The complement totalizer 8, when running into the above mentioned position, acts by its control plate 202 (Figs. 3 and 16) on the lever 261 (Figs. 2 and 7), thus causing it to swing in a clockwise direction against the action of its spring 262 around its pivot 263. Consequently, the lever 263 fast on shaft 224 is released or set free for the release of the calculating mechanism gear. Further, the complement totalizer 8, when entering into the said position, acts by the control plate 203 on the state control angle lever 264 and causes it to swing in a clockwise direction against the action of its spring 264a around the pivot screw 265 screwed into the front wall 214 of the casing 19. The elements 266 to 273 and 251 (Fig. 7) which are in driving connection with the angle lever 264, also participate in the movement and hereby the wheel 251 is caused to disengage wheel 252 and to engage wheel 274 (Fig. 6), whereby the direction of rotation of shaft 208 is changed and the type of calculation is changed from addition to subtraction. The complement totalizer 8 in place of the control plate 204 is provided with a control plate 275 swingable round a shaft 276 (Fig. 16) and when held in the position shown in said figure, the control plate 275 cannot act on angle lever 278, so that the latter is not influenced by the complement totalizer when this is moving into the position above indicated. In consequence, the coupling sleeve 205 (Fig. 2) is not operated. When moving into the indicated position, the complement totalizer 8 further acts for a short moment by means of a downwardly bent catch 279 of the forwardly extending portion 209 of the guide plate 210 on the members 336, 330 (Fig. 7) without influencing any further mechanism. At the same time the forwardly extending portion 209 of the guide plate 210 slides below roller 211 of the angle member 212, whereby the said totalizer is guided during the total-taking operation.

After the complement totalizer 8 has been placed into operative position the total-taking key 17 is depressed whereby the following mechanisms are actuated.

*Preparing the total-taking operation by depressing the total-taking key*

On the shaft 72 fixed in the carrying frame 15 a total-taking key lever 70 (Fig. 3) is swingably mounted which lever in its position of rest together with the catch 280 of arm 280a is continually pressed against the locking bar 75 by means of a spring 283 attached to said arm 280a and to a spring suspension rail 281. Said suspension rail 281 is fixed to the inside of carrying frame 15 by means of screw 282. The catch limb 74 of locking lever 73 swingably attached to the total-taking key lever 70 by means of a headed screw 77 is continually pressed under action of spring 76, against locking bar 75 fixedly mounted in the carrying frame 15. A lever 285 which is swingably mounted on the shaft 72 (Fig. 3) is caused by means of spring 286, to act continually against a face 287 of locking bar 75 whereby the position of rest of lever 285 is determined. Lever 285 cooperates with a roller 288 fixed to a cam 85 fast to another cam 289. A coupling pawl 81 (Fig. 13) shiftably connected to the cams 289 and 85 by means of pins 290 and slots 291 is continually held against the arm 79 of the total-taking key lever 70 by action of spring 82 against that pin 290 entered in the slot in the pawl 81 which also accommodates the spring, whereby the coupling pawl 81 is held in disengaged position with respect to the coupling wheel 83 non-rotatably arranged on shaft 87. By the tension exerted on the cams 85 and 289 by spring 82 the roller 288 of the cam 85 is pressed against a corresponding face 292 (Fig. 3) of lever 285 whereby the said cams are retained in the position of rest shown in Fig. 3. If the total-taking key 17 is depressed, the total taking key lever 70 is caused to swing around its pivot shaft 72 in a clockwise direction against the action of spring 283. The locking lever 73 is also displaced thereby and with its catch limb 74 slides from under the locking shaft 75 and swing around its pivot screw 77 in a clockwise direction under the action of spring 76 when the total-taking key lever 70 has finished its downward movement, whereby the catch limb 74, engages a groove 78 of locking shaft 75. In consequence, the total taking key lever 70 and the locking lever 73 are retained in the operating position described. The arm 284 of the locking lever 73 is now in operative position with respect to an element 326. Arm 79 of the total-taking key lever 70 by its swinging movement is removed from its operative position with regard to the coupling pawl 81, permitting the latter, under action of its spring 82 to move towards the coupling wheel 83 so as to engage same. Hereby the cams 85 and 289 are coupled to shaft 87 continually driven by motor 18.

*Total-taking process in the calculating mechanism*

At the inside of the casing 10 a slide 293 (Figs. 3 and 7) has been arranged which is guided with its lower bent-off end 294 in a slot of a guide plate 295 (Fig. 9). The plate 295 is screwed by means of screws 296 to the usual lower guide plate 297 by which the differential members 147 are guided. When the total-taking key 17 is depressed, arm 79 of the total-taking key lever 70 acts on the lower bent-off end 294 of the slide 293. An upper end 298 (Figs. 1 and 7) of slide 293 bent forward and projecting below the front side 214 of the casing 10 is jointed to an arm 299 of an angle lever 300, by means of a screw 301. The angle lever 300 is swingably mounted on a screw 302 screwed into the front wall 214 of the casing 10, and a fork shaped arm 303 of the angle lever engages a pin 304 (see also Fig. 1) of a slide 305. This slide 305 is arranged to be axially displaceable on the front wall 214 of the casing 10 by means of a slot 306 and a headed screw 307 screwed into said front wall 214, the slide 305 embracing and supported by the upper edge of the latter by means of a bent-off U-shaped portion 308 engaging a recess 309 (Fig. 1) of the front wall 214. A spring 310 (Fig. 7) attached to slide 293 pulls the lower end 294 of same continually downwards against the arm 79 of the total-taking key lever 70, whereby the slide 305 (Fig. 1) is normally held towards the left hand side. Both movements of the slide 305 are limited by the screw 307, against which the right-hand end of the slot 306 lies or abuts in the position of rest. The slide 305 engages with its nose 311 the underface of a zero-setting or zero-position stop 312 (Figs. 7 and 16) screwed to a U-shaped lever 314 by means of screws 315. By means of arm 316 and 317 the lever 314 is swingably arranged on shaft 208, secured against lateral displacement on shaft 208 by the driving wheel 216 and the adjusting ring 318 (Fig. 2) fast on the shaft 208. The arm 317 of lever 314 is acted upon by a spring 319 in a clockwise direction round shaft 208, the lever acting with the zero stop 312 on the nose 311 of slide 305 and pressing this slide with its bent-off portion 308 against the recess 309 of the front side 214 of the casing 10, thereby determining the position of rest or normal position of elements 314, 312 and 305. A lever 320 (Fig. 7) guided by its front end 321 in a slot 322 (Fig. 1) of the front wall 214 of the casing 10 and linked at its rear end 323 by means of a screw 324 to a lever 325 fast on the shaft 224 is adapted to act on slide 305 when shaft 224 is swung.

Figure 1:
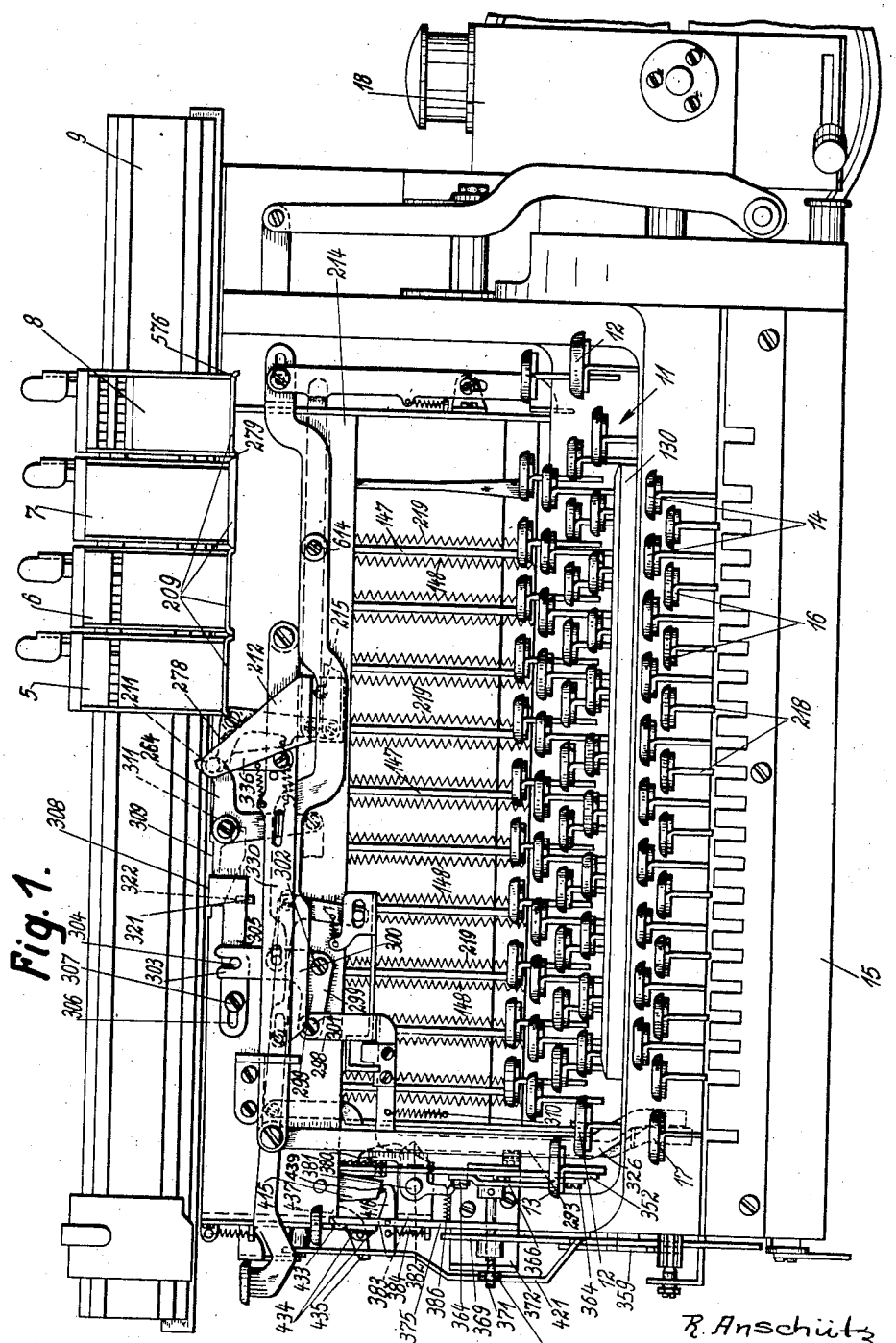
Fig. 1 shows a front elevation of a typewriting calculating machine embodying the mechanism according to the invention, in which only the suspension rail of the totalizers and the totalizers of the paper carriage are shown.
Figure 3:
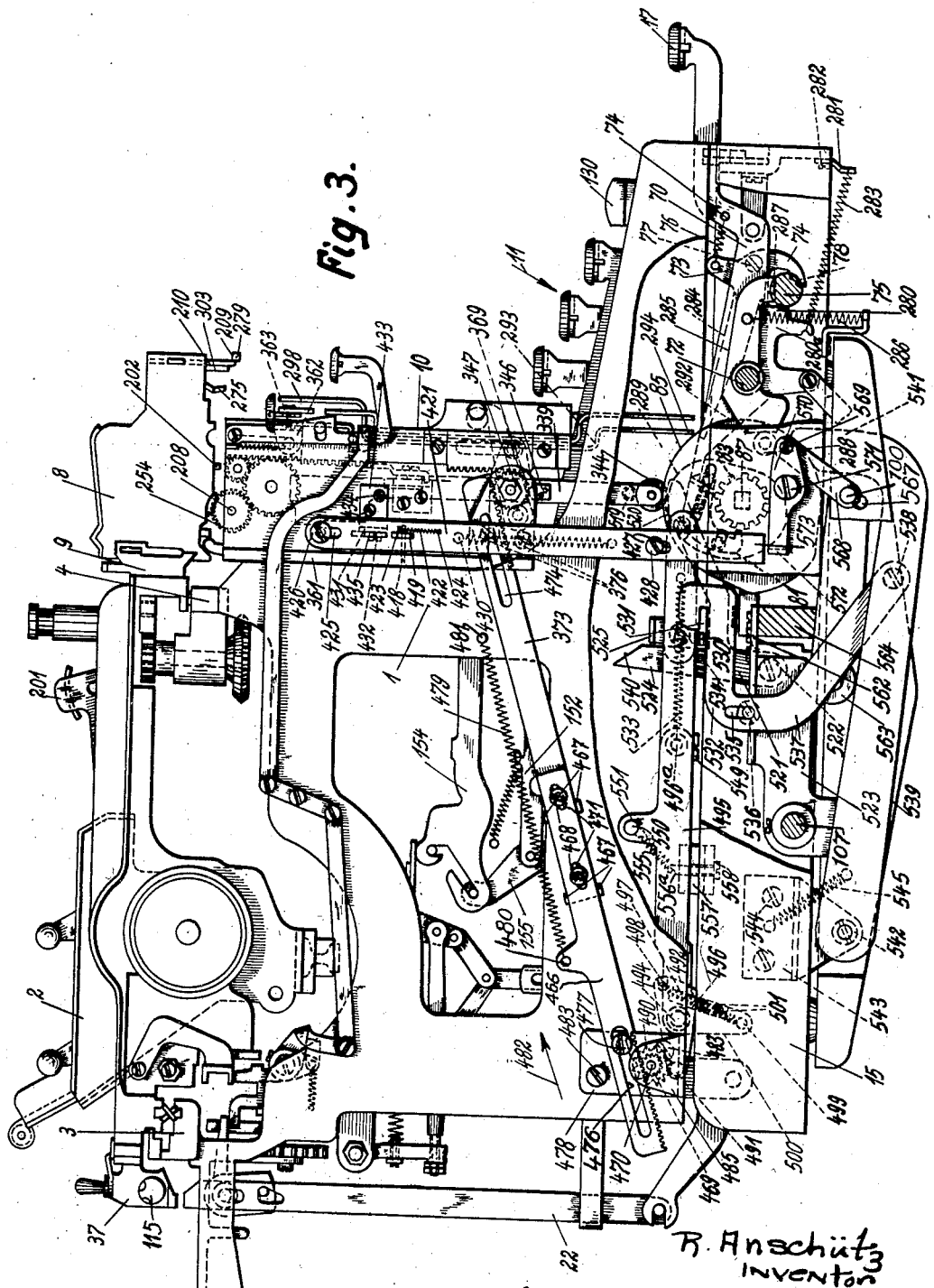
Fig. 3 shows a left-hand side elevation of the machine according to Fig. 1, in which only the most important parts of the mechanism according to the invention are shown.

In the casing 10 a release or unlocking slide 339 (Figs. 8, 9 and 10) is arranged, the lower end of which is guided in the usual guide plate 297 for the guiding of the differential members, whereas its upper end is guided in the usual guide plate 340 (Figs. 9 and 10) for guiding the differential members, which plate 340 is screwed to the front wall 214 of the casing 10 by means of screws 341. Springs 342 and 343 (Figs. 9 and 10) provided at the right and left hand sides of the unlocking or release lever 339 and acting on the same engage stationary spring hooks 342a and 343a (Figs. 9 and 10) and pull the said slide 339 continually downwards, a roller 344 on the slide being pulled against the cam 289. Hereby the normal position of the release slide 339 is determined. A lever 345 is engaged by a stop 346 fixed to slide 339. Lever 345 is swingably mounted on a headed screw 347 by means of a hub 348, said screw 347 in turn being screwed into a bearing angle 349 and fixed to same by means of a lock nut 350. A spring 352a connected to the lever 345 and to a pin 352 fixed to the inside of the back wall of the casing 10, draws the lever 345 upwardly against an eccentric disc 351 fixed to a zero-setting slide 352b (Fig. 8) by means of a nut 353 and a screw 354. The zero-setting slide is thus held with the lower end of its slot 355 pressed against a guide screw 356 and is thereby held in its normal position. The guide screw 356 is fixed in the bearing angle 349 by means of a nut 357. The bearing angle 349 is screwed to the back wall 358 of the casing 10 by means of screws 359. The zero-setting slide 352b is guided by means of its slot 355 and screw 356, so as to be non-displaceable in lateral, forward and backward directions but shiftable in a vertical direction. The upper end of the zero-setting slide 352b is guided by a pin 360 extending into a slot 361 of the zero-setting slide 352b so as to be nonmovable in forward and backward directions but shiftable in a vertical direction, and further guided in the upper guide plate 340 for the differential members against movement in a lateral direction. The bolt 360 is riveted into an angle member 362, which in turn is screwed to the inner face of the front wall 214 of the casing 10 by means of screws 363 (Fig. 3). By means of screws 364 a bridge piece 365 is screwed to the zero-setting slide 352b, the teeth along one edge of the bridge piece 365 engaging a toothed wheel 367, which in turn is fast on the shaft 368. A second toothed wheel 369 is fast on the shaft 368, which shaft is arranged rotatably between a pointed bearing pin 370 riveted into the bearing angle member 349 and a pointed bearing screw 371 screwed into an angle-shaped bearing member 372. The toothed wheel 369 meshes with a toothed rack 373. The screw 371 is adjustable and fixable in the bearing angle member 372 by means of a nut 374 (Fig. 10). The bearing angle piece 372 is screwed to the left-hand casing 10 of side member 375 (Fig. 1) by means of screws 376 (Fig. 3). Riveted to the zero-setting slide 352b by means of the rivet 377 is an angle piece 378 provided with locking or ratchet teeth 379, a ratchet pawl 380 being capable of acting on said ratchet teeth. The ratchet pawl 380 is swingably mounted on a headed rivet 381 together with another ratchet pawl 382. The headed rivet 381 is riveted into an angle member 383 screwed to the inside of the side member 375 by means of screws 384 (Fig. 1). The pawl 382 is continually drawn against a bent-off portion 385 of the ratchet pawl 380 by means of a spring 386. A spring 387 engaging the ratchet pawl 380 acts continually on the latter and on pawl 382 against the action of spring 386 in an anti-clockwise direction around the pivot rivet 381, maintaining the ratchet pawl 380 in operative position in relation to the ratchet teeth 379 of the angle member 378. Riveted to the unlocking or release slide 339 is a stop member 388, capable of acting on pawl 382. Said release slide 339 in turn is capable of acting, by means of an inclined face 220a (Fig. 9) at its upper end on a lug 389 of lever 390, which is swingably mounted on the shaft 224. By a spring 391 connected to the lever 390 and to a lever 392, the lever 390 is continually pressed against a lug 394 of the lever 392 fixed on the shaft 224 by means of a hub 395 and a screw 396. The lever 390 is mounted axially non-displaceable between the lever 392 and an adjusting ring 397 fixed on the shaft 224 by means of a screw 398. By means of a pin 399 the lever 390 is capable of acting on a lever 400 mounted on the shaft 401, which in turn is swingably supported between the back wall of the casing 10 and the front wall 214 of the casing 10. Moreover the levers 402 and 403 are mounted on the shaft 401 and provided with the pins 404 and 405 which project into an annular groove 406 of a hub 407 of a toothed wheel 408. The toothed wheel 408 is axially displaceable on the shaft 240 and is provided with catches or projections 409 which project into the slots 410 of a flange 411 (Figs. 2 and 8) mounted on the shaft 240. Accordingly, the toothed wheel 408 is arranged non-rotatably but axially displaceable in relation to the shaft 240. A spring 412 (Fig. 11) attached to a pin fixed to the back wall of the casing 10 and to the lever 400, pulls the lever 400 continually against the pin 399, and in this position of the members the toothed wheel 408 is out of operative engagement with the teeth 414 of the zero-setting slide 352b. A locking lever 415 fast on the shaft 401 overhangs and is capable of cooperating, in the operative position, with one end of a locking pawl 416 (Figs. 1 and 8) for the purpose of locking the members which are fixedly mounted on the shaft 401. The locking pawl 416 passes through a slot 417 in the side wall 375 of the casing 10 and is swingable on a pin 418. The opposite end 419 of the locking pawl 416 projects through a slot 420 of a lock releasing and restoring slide 421. Under the pull of a spring 422 attached to a pin 423 of the arm 419 of the locking pawl 416 and to a pin 424 fixed to the side wall 375 of the casing 10, the locking pawl in its position of rest is continually pressed against the lower end of the slot 420 of the slide 421. Said slide at its upper end is provided with a slot 425 through which extends a headed screw 426 screwed into the side wall 375 of the casing 10, a distance ring holding slide 421 at the required distance from the side wall 375 of the casing 10. At its lower end the slide 421 is slidably attached to the machine frame 1 by means of an elongated slot 427 and a screw 428. By means of a spring 429 attached to a pin 430 of the slide 421 and, to a pin 430a of the machine frame 1, the slide 421 is continually pulled with the upper ends of its slots 425 and 427 against the screws 426 and 428, whereby the normal position of the slide 421 is determined. A lever 431 is swingable round a headed screw 432 screwed into an angle member 433 (Figs. 1 and 3) which in turn is screwed to the outside of the side wall 375 of the casing 10 by means of screws 434. The lever 431 projects with its forward arm 435 through a slot 436 of the slide 421, while its rearward arm 437 projects through a corresponding slot of the side wall 375 (Fig. 1) of the casing 10. The lever 431 is capable, by means of its arm 437 of acting on the locking pawl 415.

In the operation of depressing the total-taking key 17 and swinging the total-taking key lever 78, this lever 78 acts with its arm 79 on the lower end 294 (Figs. 1, 3, 7) of the slide 293, thereby pushing the slide 293 upwards against the action of its spring 310. Consequently, the angle lever 300 is swung in a clockwise direction round the pivot screw 302, this movement being transmitted by means of the fork-shaped arm connection 303, 304 to the slide 305, displacing same towards the right hand side. The slide 305 now acts with the inclined face 438 (Fig. 7) of its nose 311 on the zero stop 312 and swings said stop with its bail lever 314 against the action of its spring 319 in an anti-clockwise direction round its pivot shaft 208. Thereby the zero stop assumes its working position in relation to the zero setting wheels of the complement totalizer 8 situated in calculating position.

When starting the rotary movement of cams 85 and 289 in a clockwise direction, the release slide 339 slides on the downwardly inclined portion of the cam 289 against which the slide 339 is pulled by means of its springs 342 and 343. When moving downwards, the release slide 339 acts with its inclined face 220a (Figs. 8 and 9) against lug 389 of the lever 390, swings the same and together with the lever 392 and shaft 224 against the action of spring 226 of the lever 227 (Figs. 2 and 6), in a clockwise direction. Consequently the levers 229 to 232, 242, 234, 263 and 325 fast on shaft 224 are swung in the same direction. By displacing the lever 42 (Fig. 6) the calculating mechanism gear 243 is unlocked by the releasing pawl 242. The lever 231 being in working position relative to the unlocking lever 233 (Fig. 16) of the hundreds place of the complement totalizer 8, now acts on the said lever 233 and thereby unlocks the driving member 255 of the hundreds order of the said totalizer. The lever 263 (Fig. 7) is hereby caused to swing freely without acting on any other members, since the lever 261 has become inoperative in relation to the lever 263 by contact of the control plate 262 (Fig. 3) therewith as the complement totalizer 8 moves into calculating position. By swinging the lever 325 the forward, upwardly slanting end 321 of the lever 320 is pushed through the guide slot 322 of the front wall 214 of the casing 10 and causes the slide 305 to swing slightly round the screw 307 (Fig. 7) in an anti-clockwise direction. Consequently the slide 305 acts by its nose 311 on the zero-stop 312 and causes it to swing with its lever 314 still farther against the action of the spring 319 in an anti-clockwise direction round the shaft 208. Hence, the zero-stop 312 arrives in the definite working position in relation to the zero setting wheels 441 (Fig. 16) of the complement totalizer 8, whereby the said wheels 441 are aligned in the manner described under the heading "Total-taking process in the complement totalizer." Directly at the beginning of the said swinging movement of the lever 390 (Fig. 11), the pin 399 (Fig. 8) of said lever 390 acts on the lever 400, swinging the same and its associated members 401, 402, 403, and 415 against action of the spring 412 in a clockwise direction. Hereby the wheel 408 is caused to engage with the teeth 414 (Figs. 8 and 10) of the zero-setting slide 352b. The locking lever 415 acts hereby on the pawl 416 and causes it to swing round the pivot pin 418 clockwise against the action of its spring 422 and the pawl 416 is pulled back, at the termination of the swinging movement of the pawl 415, into its normal position, by means of the spring 422, locking thereby with its locking nose 439 (Fig. 1) the locking lever 415 and the members associated therewith in the working position, whereby the toothed wheel 408 is held in engagement with the teeth 414 of the zero-setting slide 352b. As soon as these operating steps, which were started immediately at the commencement of the downward movement of the release slide 339, are finished, the said slide 339 acts, in its further downward movement, by means of its trip member 388 on the pawl 382 and causes it to swing together with the pawl 380 round the pivot rivet 381 in a clockwise direction against the action of the spring 387. Hereby the pawl 380 is disengaged from the locking teeth 379 of the angle member 378, releasing thereby the zero-setting slide 352b for a downward movement. Now the toothed wheels 367 and 369 are rotated, under the action of a spring-operated slide 373, 466 (Fig. 12), which co-acts with the toothed wheel 369, in a clockwise direction, the rotary movement of the toothed wheel 367 being transmitted to the zero-setting slide 352b. In consequence, the zero-setting slide is moved downwards acting in turn on the toothed wheel 408 and rotating same together with the differential shaft 240 (Figs. 2 and 6) also in a clockwise direction. This rotary movement is transmitted, by means of the driving members 251 and 274, to the master wheel shaft 208 and the driving or master wheel 216, whereby the driving wheel 216 is caused to rotate in an anti-clockwise direction. During its rotary movement the driving wheel 216 acts on the driving members 255, 256 of the hundreds place of the complement totalizer 8. In the said downward movement of the zero-setting slide 352b, its eccentric disc 351 depresses the lever 345, causing it to swing around its pivot screw 347 in a clockwise direction against the action of the spring 352a. The stop 346 releases the lever 345 for this movement at the start of the downward movement of the release slide 339. After the release slide 339 has been moved, during the further downward movement with its trip member 388, past the pawl 382, the pawls 382 and 380 return to their normal positions under the action of the spring 387 to engage the pawl 380 with the locking tooth 379 located exactly opposite to it at the termination of the downward movement of the zero-setting slide 352b, thereby preventing the zero-setting slide 352b from moving downward farther than the respective end position. During the farther downward movement of the release slide 339 it will act on members for the purpose of preparing the typing operation.

*Total-taking process in the complement totalizer*

In addition to the driving wheels 256 intermediate wheels 257 and numeral wheels 258 described under the heading "Normal calculating and typing operation taking place when making booking entries in the columns I to III of the form" the complement totalizer 8 is provided with the zero-setting wheels (Fig. 16) engaged with the driving wheels 256, and being capable of co-operating by means of the zero-setting noses 442 with the zero stop 312 (see also Fig. 7) described under the heading "total-taking process in the calculating mechanism." The zero-setting wheels 441 are further provided with teeth 443 of half the normal height, capable of controlling a clear sign feeling member 444, which is swingably mounted between the side members of the complement totalizer 8 by means of the pins 445 and is held by means of a spring 446 in the rest position shown in Fig. 16. By means of a nose 447 the clear sign feeling member 444 is capable of acting on parts 448, 449, 450 (Figs. 16, 17) of a clear sign key locking device. Further, the complement totalizer 8 is provided with the intermediate wheels 451 and complement numeral wheels 452 and with the members 453, 454 and 455 (Fig. 17) for concealing the credit or the debit balance wheels 258 or 452, as determined by the character of the true balance whether positive or negative, said members being actuated by means of a hand lever 456. When the lever 456 and flap 453 are shifted, the flap 453 acts by means of a nose 457 on an arm 458 of the swingable control plate 275, described under the heading "Automatic total taking" and places the same into working position with the lever 278 (Fig. 7). The complement totalizer 8 is also fitted with a lever 459 capable of acting by means of a nose 460 on a rod system described under the heading "Return of carriage" for the purpose of releasing automatically the carriage return device.

Hence, if the main wheel 255 of the hundreds place of the complement totalizer 8 is rotated one revolution by means of a driving wheel 216, which, is rotated in an anti-clockwise direction when the zero-setting operation is started, the main wheel 255 of the hundreds place is acted upon in the clockwise sense and its movement is transmitted to the associated numeral wheels 258 and the associated zero-setting wheel 441. Hereby the numeral wheel 258 is rotated in a clockwise direction and the zero-setting wheel 441 in the anti-clockwise direction. Whereas, according to the value "417.95" to be withdrawn, a "4" is shown in the hundreds place of the complement totalizer 8, that is since four units have been registered in the same, the zero-setting tooth 442 is to be rotated through four units. Therefore, the zero-setting wheel 441 is also moved backwards through four units in the above mentioned rotary movement, until its zero-setting tooth 442 strikes against the zero stop 312 whereby the movement of all parts operatively connected therewith is arrested. The driving members 208, 274, 251 (Figs. 16 and 6), 408 (Fig. 8), 414, 352b, 366, 367, 369 of the calculating mechanism therefore are turned, according to the above statement, also four units. In the zero-setting operation the zero stop 312 co-acts with the zero-setting wheels 441 as follows: The toothed driving segment of the zero-setting wheel of the hundreds place to be written clear in the complement totalizer 8 is hereby rotated without hindrance through a recess 461 (Fig. 7) of the zero stop 312 until its laterally extended zero-setting tooth 442 strikes against the nose 462. The zero stop 312, if placed into operating position with relation to the zero-setting wheels, engages by means of its noses 463 and 464 the teeth of the zero-setting wheels of the next higher or lower places. Hereby the zero-setting wheels 441 are aligned and positively retained in the position of alignment so that the unavoidable clearance in the other driving elements is not increased by the zero-setting wheels. Also the zero stop 312, by rendering the amount of excessive movement in the zero-setting operation, prevents a transfer to the place next higher or lower to the calculating place being set to zero. As soon as the numeral wheel of the hundreds place of the complement totalizer reaches its zero position in a total-taking operation, it is arrested by the zero stop 312.

*Preparing the typing operation in the total-taking action*

The wheel 369 meshes with a slide 373 (Figs. 3, 8 and 12) by means of the teeth 465. A further slide 466 guided between bent-off lugs 467 of the slide 373 and screwed to the same by means of the screws 468, is in engagement with a toothed wheel 469 fixed on a shaft 470. The slides 373 and 466 are relatively adjustable by means of the slots 471 provided in the slide 466 and, when screwed together, act as one slide. The slide 373 is laterally guided in a slot 472 (Fig. 8) of the bearing angle member 372 (Fig. 8) and is maintained with the teeth 465 in the required engagement with the toothed wheel 369 by means of a screw 473 (Fig. 8) projecting through a slot 474 of the slide 373 and screwed into the angle piece 372. The slide 466 is maintained with the required engagement of its teeth 475 with the toothed wheel 469 by means of a slot 476 and a headed screw 477 (Fig. 12) projecting through said slot and screwed into the angle member 478. Hereby the slide 466 is at the same time laterally guided between the angle member 478 and the head of the screw 477. A spring 479 (Figs. 3 and 12) attached to an eye 480 of slide 466 and to a pin 481 fixed to the machine frame 1 tends to move the slides 466 and 373 in the direction of the arrow 482 (Fig. 3). In the position of rest, movement of said slide is limited by the gear members 369, 367, 366, 352b through the cooperation of the locking pawl 380 with the ratchet teeth 379 (Fig. 8) of the angle member 378. The bearing angle member 478 (Figs. 3 and 12) is screwed to the left hand outside of the machine frame 1 by means of screws 483. The shaft 470 is rotatably supported at one end by a pointed screw 484 screwed into a bent-off portion 485 of the bearing angle 478, said pointed screw being adjustable and fixable in said bent-off portion by means of a nut 486. At the other end, the shaft 470 is rotatably supported by a pointed bolt 487 riveted into a bearing angle 488, which is screwed to the inside of the back wall of the machine frame 1 by means of screws 489 (Figs. 3, 12 and 14). The shaft 470 with the toothed wheel 469 projects through a corresponding bore of the bearing angle member 478. Fixedly mounted on the shaft 470 is also a notched wheel 490 (Figs. 3, 12 and 14) which co-acts with a roller 491 of a lever 492, which lever is swingably mounted by means of a hub 493, on the shaft 494 of a swinging frame including the shaft 494 and the left and right side levers 495 and 504. The lever 492 is held laterally non-displaceable between the lever 495 also associated with the said swinging frame and a guiding angle member 496. By means of a spring 497 attached to a pin 498 of the lever 492 and to a pin 499 of an arm 500 of the lever 495, the roller 491 is continually held in working position in relation to the notched wheel 490. The guiding angle member 496 screwed to the arm 500 of the lever 495 by means of the screws 501, limits the swinging movement of the lever 492 imparted by the spring 497, if the roller 491 is removed from the working position in relation to the notched wheel 490. Further, on the shaft 470 there are fixedly mounted twelve spirally arranged noses 502 (Figs. 4, 12 and 14) arranged in the form of twelve symmetrical spokes of a wheel, i. e., displaced by 30° each to one another. Associated with said noses 502 are twelve angle levers 503 swingably mounted on the shaft 494, and associated with the numeral key levers 149 for the numerals "0" to "11." The numeral key levers 149 for the numerals "0" to "9" are associated with the differential members 260, 147, (Fig. 6) as used in "Addelektra-machines" for booking entries in German currency. The numeral key lever 149 for the numerals "10" and "11" have been provided in this case for the not represented tens and elevents differential members as provided in Addelektra typewriter-calculating machines for booking entries in British currency. The angle levers 503 are arranged between the left hand lever 459 (Fig. 13) and the right hand lever 504 of the hereinafter described swinging frame 495, 494, 504 on the shaft 494 of the latter and are laterally spaced from one another as required by means of tubular distance members 505. The vertically extending arms 508 of the respective angle levers 503 are guided in corresponding slots 506 of a guide bar 507 (Figs. 4, 14) to act upon the bent-off portions 509 at the rear ends of the numeral key levers 149 corresponding to the numerals "0" to "11." By means of the springs 510 attached to the arms 508 of the angle levers 503 and to the bent-off noses 511 of the guide bar 507 the arms 508 of the angle levers 503 are continually pulled against the forward ends of the guide slots 506 and are thus held out of working position in relation to the bent-off portions 509 of the numeral key levers 149. The guide bar 507 is screwed by means of the screw 512 to the bent-off portion 514 (Figs. 3 and 14) of the bearing angle piece 488 and is screwed to a fastening angle 515 by means of a screw 516. The fastening angle 515 is screwed to the inside of the machine frame 1 by means of the screws 517. The noses 502 fast on the shaft 470 are engageable by the arms 518 of the respective angle levers 503. As long as the parts of the mechanism are in the rest position, the nose 502 associated with the angle lever 503 or the numeral typing key lever 149 for the numeral "0," respectively, is in working position relative to the arm 518 of the said angle lever 503. The other noses 502 are brought into working position in dependence on the zero-setting operation, that is to say, the nose 502 corresponding to the digit registered on the numeral wheel which is returned to zero in the respective case, is brought into working position to the arm 518 of the associated angle lever 503. The release slide 339 described under the heading "Total-taking process in the calculating-mechanism" is capable of acting by means of its pin 519 on an arm 520 (Fig. 13) of a lever 521 arranged swingably on a screw 522 screwed into a bearing angle 523 (Fig. 3). The lever 521, when operated, is capable of acting, by means of an arm 524 on a bent-off portion 525 of a slide 526. The slide 526 is attached to a forward extension 527 of the rocking frame lever 495 by means of the slots 528 and headed screws 529 so as to be axially shiftable, and is adapted to engage, by means of a bent-off portion 530, a slot 531 of the lever 532. A spring 533 attached to a pin 534 of the slide 526 and to a bearing or pivot bolt 496a of the lever 495, continually pulls the slide 526 rearwardly in the direction of its position of rest engaging the headed screws 529 with the forward ends of its slots 528, whereby its bent-off portion 530 is held out of working position in relation to the slot 531 of the lever 532. The lever 532 is mounted for shifting vertically at the inside of the carrying frame 15, by means of a slot 535 and a screw 536 and its lower arm 537 is pivoted at 538 to a lever 539. The inclined upper end 540 of the arm 524 of the lever 521 is provided for the following reason: In the Mercedes Addelektra machine the machine frame 1 may be swung away from the carrying frame 15 upwards and rearwards. By this swinging movement the bent-off portion 525 of the slide 526 is moved out of working position with respect to the arm 524 of the lever 521, whereby the lever 521 drops by its own weight on the bearing of the shaft 87 and with its arm 524 is placed into the path of movement of the bent-off portion 525 of the slide 526. Now, if the machine frame 1 is swung back, the bent-off portion 525 slides along the inclined face 540 of the arm 524 of the lever 521 and swings the lever 521 back again into the position illustrated in Fig. 3.

Now, if the wheels 367 and 369 (Fig. 3), under the action of the spring 479 are rotated in a clockwise direction as described under the heading "Total-taking operation in the calculating mechanism" in the operation of resetting a numeral wheel to zero, which operation necessitates a rotation of the numeral wheel through four units, this movement is transmitted, under action of spring 479 by means of the toothed slides 373 and 466, to the toothed wheel 469 and thereby to the shaft 470. Accordingly, the shaft 470 and the noses 502 (Figs. 4 and 12) fast on it are also rotated in the clockwise direction by an amount corresponding to four units. Hereby the nose 502 associated with the angle lever 503 for the numeral key lever 149 for the numeral "4," is placed into working position with respect to the arm 518 of the said angle lever 503. In order to ensure that the selected nose 502 is actually placed into working position and in order to avoid any excess movement due to clearance in the driving gear or in order to compensate for the same, the notched wheel 490 (Fig. 3) in the said rotary movement of the shaft 470 co-acts with the roller 491 of the locking lever 492. In the further downward movement of the release slide 339, said slide acts by means of pin 519 on the arm 529 (Figs. 3 and 13) of the lever 521 and swings same round the bearing screw 522 in a clockwise direction. Hereby the lever 521 with its arm 524 acts on the bent-off portion 525 of the slide 526 and displaces it against the direction of arrow 99 (Fig. 13) against the action of the spring 533. Accordingly, the lug 530 of the slide 526 is caused to engage with the slot 531 of the lever 532 to constitute a temporary driving connection between the lever 532 and the lever 495 of the swinging frame 495, 494, 504.

*Typing operation*

The cam 85 described under the chapter "Preparing the total-taking operation by depressing the total-taking-key" is capable of acting, in its rotary movement, on an arm 541 of the lever 539 (Figs. 3 and 13), connected with the above described lever 532 by means of the screw 538. The lever 539 is swingably mounted, by means of a headed screw 542, on a bearing angle member 543 screwed in turn to the inside of the carrying frame 15 by means of screws 544 (Fig. 3). A spring 545 attached on the one side to a pin 546 of the bearing angle 543 and on the other side to a pin 547 of the lever 539 pulls the lever 539 with its arm 541 continually against the cam 85. The swinging frame 495, 494, 504 formed by the levers 495 and 504 and the shaft 494 is swingably mounted in the carrying frame 15 by means of a pivot bolt 496a and by means of pivot bolt 548, the pivot bolts 496a and 548 being fixed to the side members of the carrying frame 15 by means of the screws 549 Fig. 3. A shaft 550 fixed in arms 551 and 552 of levers 495 and 504 serves to stiffen the said swinging frame. A further means of stiffening the swinging frame 495, 494, 504 is provided by shaft 553, which is fixed to an arm 500 of the lever 495 and to an arm 554 of the lever 504. The swinging frame 495, 494, 504 is normally held at the limit of its anti-clockwise travel by a spring 555 attached to a spring attachment bolt 556 (Fig. 14) fixed to the shaft 550, and to a spring attachment bolt 556a (Fig. 3) fixed to a bearing member 557. This swinging movement is limited by the lever 504 striking against a screw 558 screwed into the bearing member 557, whereby the position of rest of the swinging frame 495, 494, 504 is determined. Thus, the rear end of the rocking frame is held depressed while the arm 527 of side lever 495, which extends forwardly beyond the pivot points 496a and 548 of the frame, is held at its upward limit of travel. If now, in the rotary movement of the cams 289 and 85 the cam 85 with its elevated part 559 acts on arm 541, the lever 539 (Figs. 3 and 13) is swung round the bearing screw 542 in a clockwise direction against the action of its spring 545, the attached lever 532 participating in this movement. In the downward movement of lever 532 hereby effected, the slide 526 and, accordingly, the swinging frame 495, 494, 504 are also acted upon owing to the temporary driving connection 530, 531 previously established with the forwardly extending arm 527 of the frame side lever 495. Accordingly, the swinging frame 495, 494, 504 is swung round the bearing bolts 496 and 548 in a clockwise direction against the action of the spring 555, whereby the angle levers 503 mounted on the shaft 494 of the said swinging frame are raised. Since, in the zero-setting operation, the nose 502 associated with the typing numeral key lever 149 for the numerals "4" has been placed into working position with respect to the arm 518 of the angle lever 503 also associated with the typing numeral key lever 149 for the numerals "4", the arm 518 of this angle lever 503 strikes against the said nose 502 immediately at the commencement of the said swinging movement of the swinging frame 495, 494, 504 or at the start of the upward movement of an angle lever 503, respectively. Hence this angle lever 503 is swung, in the farther swinging movement of swinging frame 495, 494, 504, round the shaft 494 in an anti-clockwise direction against the action of its spring 510, whereby to locate its arm 508 into working position with respect to the bent-off portion 509 of the numeral key lever 149 of numeral "4" that is, beneath the lip 509. As the swinging frame 495, 494, 504 is completing its clockwise rocking travel, it presses the arm 508 of the angle lever 503 upwardly against the bent-off portion of the rearward extension of said typing numeral key lever 149, whereby the numeral key lever is swung round its bearing bar 259 in a clockwise direction against the action of its spring 560 Fig. 4. Hereby the driving connection is established by means of the intermediate member 151 between the cam shaft 153 continually driven by the motor 18 and the draw lever 152, whereby the type lever 154 for the numeral "4" is swung over the intermediate lever 155, and the numeral "4" is written down is column IV of form 200. When type lever 154 falls back, the carriage escapement device (not shown) is acted upon, whereby the carriage is unlocked for a movement to the left corresponding to one carriage step. Hereby the wheel of next lower order of the complement totalizer 8 is placed into calculating position.

In the further rotary movement of the cams 289 and 85 the following mechanisms are also actuated by means of the cam 85.

Figure 5:
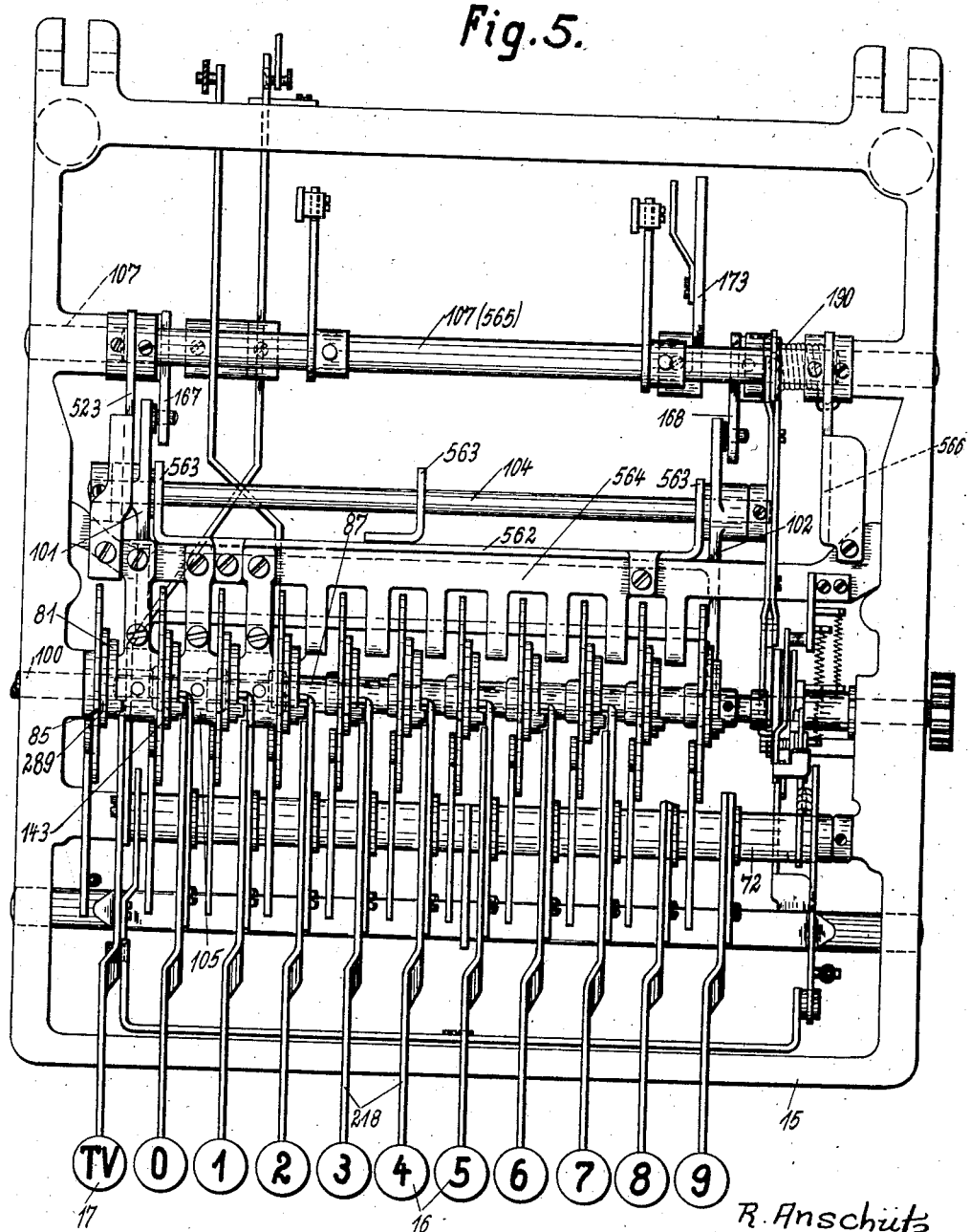
Fig. 5 is a plan view of the supporting frame of the machine according to Fig. 1 with the driving members positioned in the frame.

The cam 85 is capable of acting on a roller 99 (Figs. 1 and 15) arranged on a shaft 100 of a swinging frame 100, 101, 102, 103, 104 (Figs. 5 and 15). The said swinging frame is swingably mounted by means of its shaft 104 in a bearing bridge 562 and bearing angles 563, which, in turn are fixed to a bridge 564 (Figs. 5 and 3) of the carrying frame 15. A lever 173 fixed to a shaft 565 is in operating or driving connection with the swinging frame 100, 101, 102, 103, 104 by means of levers 167 and 168 also fixed to the shaft 565. This shaft 565 is swingably supported at its opposite ends by the bell crank hangers 523 and 566, the depending arms of which hangers are fixed to a shaft 107 supported in the carrying frame 15. The forwardly extending arm of the bell crank hangers 523 and 566 are secured to the respective opposite ends of the bridge or cross brace 564 of the sub-frame 15.

The lever 173 is capable of acting during the actuation of the said swinging frame upon a device not shown having a spring urged carriage controlled by an escapement.

By means of a roller 105, which is arranged on the shaft 100 the swinging frame 100, 101, 102, 103, 104 acts upon the levers 106 and 111, whereby the comma skipping device not shown for skipping the comma place during the automatic total taking is actuated.

The shaft 100 is extended at the left hand side and projects through a slot 567 (Fig. 8) in the carrying frame 15. At the outside of the carrying frame 15 a lever 568 is fixed on the shaft 100, which lever is jointed, by means of a screw 569 to a rocking device 570 (Figs. 3, 8 and 15). The rocking device 570 is swingably supported on a headed screw 571 screwed into the carrying frame 15 and by means of a bent-off member 572 it is capable of acting on the lower end 573 of the slide 421.

If now the cam 85 in its further rotary movement acts by means of its nose 559 (Fig. 15) on roller 99, the swinging frame 100, 101, 102, 103, 104 is swung in the bearings 562, 563 in a clockwise direction. In this movement the members 167, 168, 565 and 173, also participate whereby the lever 173 is swung in an anti-clockwise direction against the action of the spring 190. Hereby the lever 173 acts on an automatic or forced motion carriage shift.

The swinging frame 100, 101, 102, 103, 104 also acts during the said swinging movement, by means of its roller 105, on the lever 106 and thereby also on the lever 111, whereby the skipping device is actuated in the comma place of the complement totalizer.

*Returning the actuated mechanisms*

Moreover, in the said swinging of the swinging frame 100, 101, 102, 103, 104 the lever 568 fixed to the extended left hand end of the shaft 100 (Figs. 15, 3, and 8) is also drawn downwardly. Accordingly, the rocking device 570 is swung round its pivot 571 (Figs. 3 and 8) in a clockwise direction, whereby its bent off portion 572 raises the slide 421 against the action of the spring 429. Hereby the arm 419 of the locking pawl 416 is lifted against the action of the spring 422, and said pawl 416 is swung around the bolt 418 in a clockwise direction. In consequence, the locking lever 415 is disengaged by pawl 416 so that the lever 415 and the parts 401, 400, 402, 403 and 408 (Fig. 11) associated with said lever are swung into normal position by action of the spring 412. In case, however, the friction between the tooth flanks of the tooth wheel 408 and the flanks of the zero-setting slide teeth 414 meshing with the wheel 408 is so great that the tooth wheel 408 does not disengage itself from the teeth 414 of the zero-setting slide 352b by the action of spring 412. Disengagement takes place by forced motion through the lever 431. The lever 431 is automatically swung clockwise during the said displacement of the slide 421 owing to the driving connection 421, 435 (Figs. 3 and 8), its arm 437 to rock the locking lever 415 counter-clockwise, whereby said lever 415 and the parts 401, 400, 402, 403 and 408 associated with it are automatically swung back into their normal positions.

Figure 4:
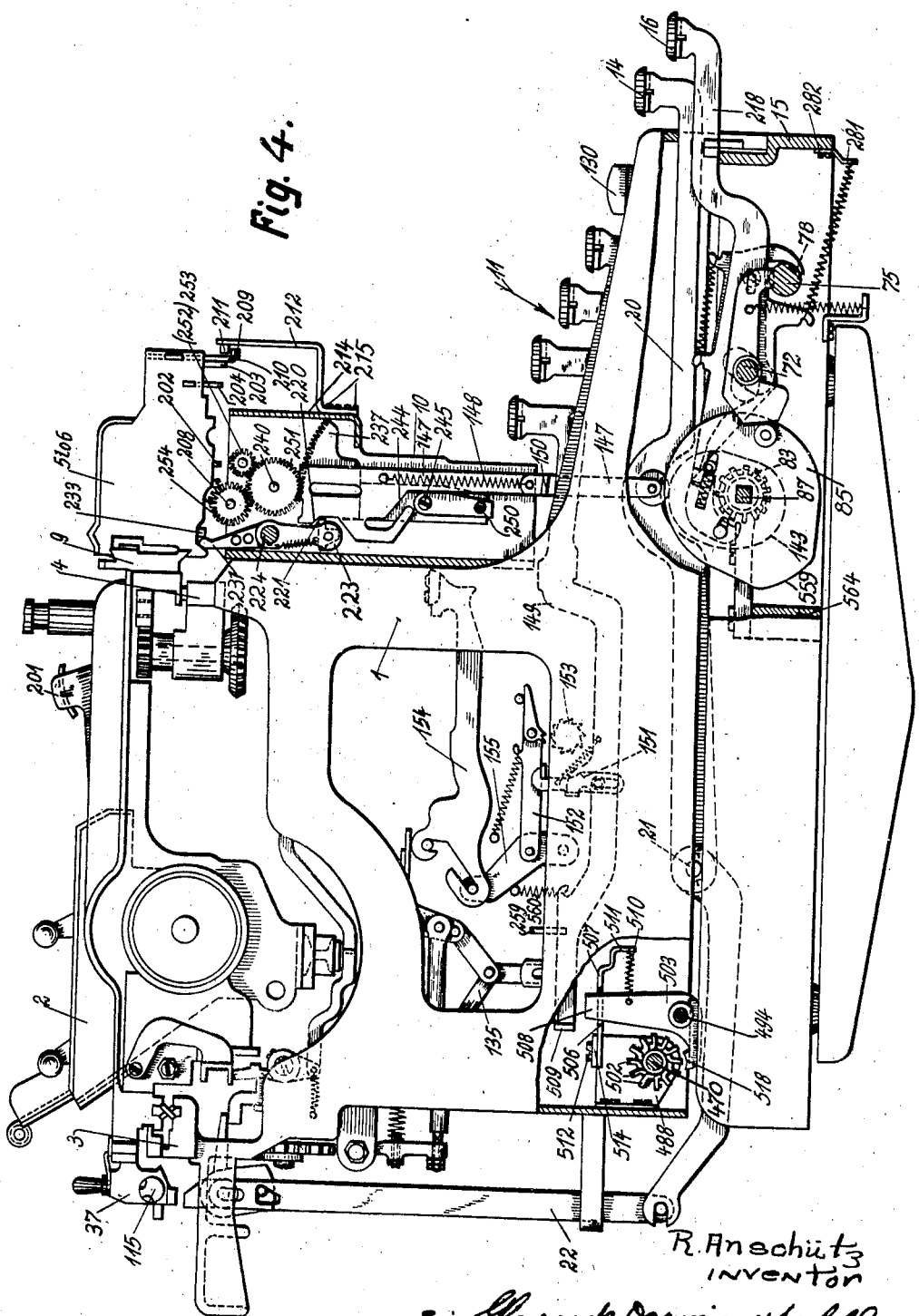
Fig. 4 shows a left-hand side elevation of the machine according to Fig. 1, in which the parts shown in Fig. 3 are omitted so as to give a clear view of other parts of the machine.

In the further rotary movement of the cams 289 and 85 the nose 559 of the cam 289 acts on the roller 344 of the release slide 339, which is hereby again raised against the action of the springs 342 and 343. Hereby it acts by means of the stop 346 on the lever 345 (Figs. 3 and 8) and through this in turn on the zero-setting slide 352b, whereby said slide 352b is also raised and returned into its normal position. The locking teeth 279 of the angle piece 378 of the zero-setting slide 352b click under the locking pawl 380 so that the pawl may retain the said slide 352b and thereby also the release slide 352b in the normal positions upon the cessation of this return movement. In the return movement of the zero-setting slide 352b, the parts 367, 369, 373, 466, 469, 470, 490 and 502 also participate which return to their normal positions against the action of springs 479 and 497. Accordingly, also the swung lever 503 Fig. 12 is returned to its normal position by action of its springs 510, whereby also the bent-off part 509 of the key lever 149 acted on by lever 503 is released and the key lever 149 is swung back into its normal position by action of its spring 560 (Fig. 4). In the meantime the cam 85 in its further movement has rotated to position its low face opposite the arm 541 (Fig. 3) of the lever 539, whereby the said lever 539 is returned to its normal position by action of its spring 545. Hence, the lever 532 and the swinging frame 495, 494, 504 also return to their normal positions under action of the spring 555 (Fig. 3). During the further rising movement of the release slide 339, the arm 520 (Fig. 13) of the lever 521 is released by the pin 519, so that under the action of the spring 533 the coupling 530, 531 is disengaged. In the meantime the low face 575 of the cam 85 has come opposite the roller 99 (Fig. 15) of the swinging frame 100, 101, 102, 103, 104 so that the said swinging frame is also swung back into its normal position by the action of the spring 190. Accordingly, also the rocking device 570 (Fig. 8) returns to its normal position, in which return movement the slide 421 and the lever 416 and 431 participate, by the action of the springs 429 and 422. The other mechanisms actuated by the swinging frame 100 to 104 also return to their normal positions by forced motion or by action of their associated springs, respectively. When the rising movement of the release slide 339 is finished, the inclined face 220 of the release slide 339 withdraws from the lug 390. The levers 390 and 392 and the parts 224, 231, 229, 230, 232, 263, 227, 242 and 325 return to their normal positions under the action of the spring 226 whereby the calculating mechanism and the totalizer situated in calculating position are locked again. Hereby the lever 320 (Fig. 7) is drawn backwards into its normal position. At the same time the zero stop 312 and the lever 314 are swung back somewhat in the clockwise direction under the action of the spring 319, whereby the zero stop 312 is placed out of alignment with the zero-setting wheel 441 (Fig. 16) of the complement totalizer 8 remaining, however, in readiness for operation therewith.

Now, as the total-taking key 17 is held depressed by means of the locking device 74, 78 (Fig. 13) which is released later on, the total-taking lever 70 cannot act with its arm 79 to disconnect the coupling pawl 81, at the termination of a rotation of the cams 289, 85, so that the pawl 81 is not uncoupled from the shaft 87. Consequently, the cams remain coupled to the shaft 87 for another revolution, during which the operations are repeated. Owing to the carriage step movement heretofore effected, the next lower place of the value "417.95," that is, the "1" is now withdrawn from the complement totalizer 8 and written down in the column IV of form 200. Thus, by continued revolutions of the cam discs 289 and 85, the complement totalizer 8 is automatically "written clear," one place after the other, whereby the operations are repeated in each calculating place. The comma place is skipped by means of a comma skipping device, whereby one carriage step is caused to take place. When, in the automatic clear writing of the complement totalizer 8 the carriage step effected after clearing the totalizer wheel of lowest denomination of the complement totalizer is performed, the total taking key lever 70 is released and comes in its normal position, whereby the rotational movement of cams 289, 85 is stopped. The members 293, 300 and 305 (Fig. 7) also follow this return movement of the arm 79 of the total-taking key lever 70 and move back into their normal positions by action of the spring 310. Hereby the zero stop 312 slides off again from the inclined face 438 of the nose 311 of the slide 305, returning again, under action of its spring 319, into its normal position determined by its contact on the nose 311 of the slide 305. In this position the zero stop 312 is again definitely out of working position in relation to the zero-setting wheels 441 of the complement totalizer 8 and the total taking is finished.

*Clear sign printing*

Figure 2:
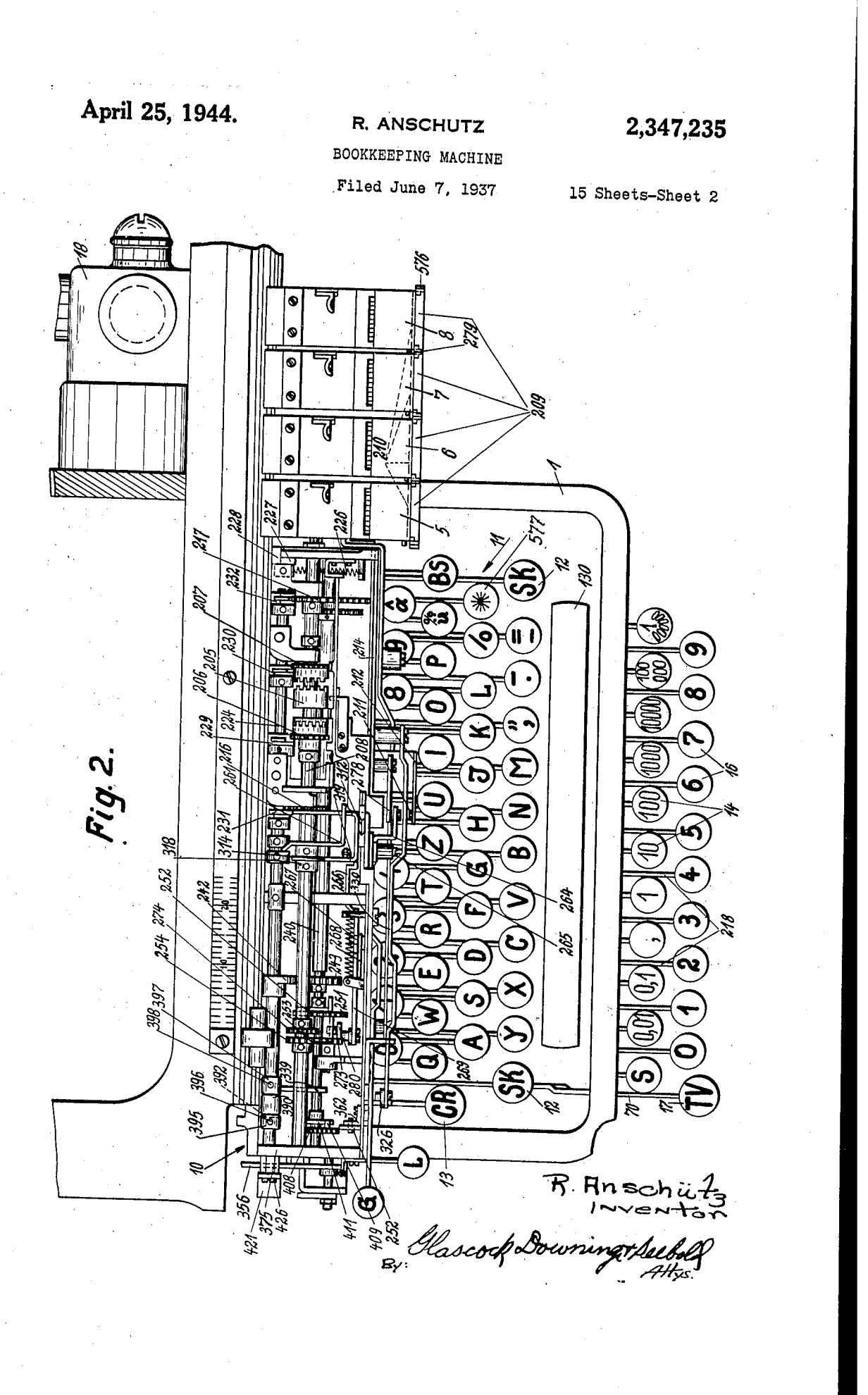

Further, in the above mentioned carriage step, the clear sign flap 444 (Figs. 16 and 17) acts by its nose 447 on the pin 448 of the locking lever 449 for the clear sign key 577 (Fig. 2). Hereby the lever 449 is moved from its locked position into its unlocked position, if all numeral wheels of the complement totalizer stand on zero, that is, if the clear sign flap 444 co-acts with the short teeth 443 of the zero-setting wheels 441 (Fig. 16) so that in this position of the members the clear sign key 577 may be depressed. If, however, not all the numeral wheels of the complement totalizer 8 have been set to zero, the clear sign flap co-acts with the normal teeth of the zero-setting wheels 441 and the locking lever 449 is swung out of its locking position into its other locking position. Hence, the clear sign key 577 cannot be pressed down.

Return to carriage

If now the complement totalizer has been written clear, the clear sign key 577 is depressed, whereby the clear sign is printed by means of a type lever associated to this key. With the carriage step occurring upon the return of the clear sign type lever, the nose 460 (Fig. 17) of the lever 459 of the complement totalizer 8 acts on a mechanism, not illustrated, whereby a carriage return coupling is automatically closed. The carriage return coupling and the associated linkage are not illustrated in the present application, because they are described and shown in the U. S. Patent 2,046,524 in which patent the carriage return coupling is indicated by the characters 171, 172, 173, 175, 174 (Fig. 3), 176 (Fig. 1). At the termination, therefore, of the clear writing operation of the complement totalizer 8, the carriage return mechanism is automatically actuated. During such return movement of the carriage, the levers 261, 264 and 278 (Figs. 2 and 7) are idly acted on by the associate control plates of the totalizers 5 to 8, without, however, causing any further action.

Rendering the carriage return mechanism ineffective

In order to render the mechanism as described under the heading "Return of carriage" for automatic operation of the carriage return mechanism ineffective when displacing the paper carriage by hand by actuating the carriage release lever 201 (Figs. 3 and 4) and when depressing a tabulator key to the tabulator keys 14 (Fig. 4), the following rod system is actuated.

When depressing the carriage release key 201 or a tabulator key 14, the carriage step lock is rendered ineffective in a manner as described in the Patent 2,046,524.

Although the invention is described by way of example as applied to a Mercedes-Addelektra typewriting-calculating machine, it may be applied, with more or less alteration, to any other typewriting-calculating machine, without departing from the real spirit of the invention.

Having now particularly described and ascertained the nature of my said invention and in what manner the same is to be performed, I declare that what I claim is:

1. In a power-driven machine of the class described, having a travelling paper carriage; the combination with a register, having a plurality of order wheels; a master actuator between which and the order wheels there is relative axial movement to enable the engagement of the master actuator with successive order wheels; a motor; and value typing levers; of a total printing control means, including zero stop gears in train with, and individual to, the order wheels; a zero stop with which the zero stop gears coact to arrest the order wheels at their zero positions; a zero setting member and connections with the master actuator to restore the order wheels successively to zero; means operable by the motor to actuate the value typing lever corresponding to the value registered upon an order wheel, subsequently to the return of the order wheel to its zero position; means under the control of the zero setting member as it resets said order wheel to zero, to select the proper value typing lever subsequently to the return of the reset order wheel to its zero position for operation, said selecting means including bell cranks to engage their respective value typing levers with the motor-driven actuating means; a plurality of tappets adjustable into and out of effective position relatively to the bell cranks with which the tappets are associated; the adjustment of the tappets depending upon the extent of travel of the zero setting member, which is determined by the coaction of the successive zero setting stop gears with the zero stop; and motor-driven means to contact a bell crank with its associated tappets when set to effective position, to cause the bell crank to effect engagement of its corresponding value typing lever with the motor-driven actuating means.

2. In a power-driven typewriting-accounting machine, the combination with a travelling paper carriage, having a plurality of order wheels; a register; a master actuator with which the order wheels successively engage; a motor; a drive shaft operated thereby; and value typing levers operable by the drive shaft; of zero stop gears in train with the order wheels; a zero stop to coact with the zero stop gears to arrest the order wheels in their zero positions; a special key to condition the machine for clearing and total taking; clearing and total printing control means, including a zero setting member and connections with the master actuator to reset the order wheels to zero successively; means to lock the zero setting member in its normal position; a release member to control the locking means aforesaid; means actuated from the main drive shaft, to control the operation of the release member, whereby the lock for the zero setting member is disengaged near the beginning of the zero-setting operation of each order wheel; and differentially adjustable selecting means controlled by the zero setting member as to extent of adjustment upon resetting an order wheel to zero, to trip the selected value typing levers for operation, the differentially adjustable means, including a shiftable selecting member common to the several value typing levers; trip elements individual to the several value typing levers and interposed between the selecting member and the value typing levers for selection by the selecting member; and means actuated in timed relation with the zero setting member to render the selected element effective to trip the proper value typing lever.

3. In a power-driven typewriting-accounting machine, the combination with a travelling paper carriage, having a plurality of order wheels; a register; a master actuator with which the order wheels successively engage; a motor; a drive shaft operated thereby; and value typing levers operable by the drive shaft; of clearing and total printing control means, including a zero setting member to reset the order wheels to zero successively; transmission means between the master actuator and the zero setting member, having a normally ineffective connection; means to lock the zero setting member in its normal position; means to control the normally ineffective connection, including a rock shaft; an arm fast on the rock shaft; a second arm journaled on the rock shaft for independent rotation thereon, and effective upon the first-named arm to rock the rock shaft, when shifted in one direction; means operable by the rock shaft to set the connection to effective position; a release member to control the locking means for the zero setting member, and to rock said second arm; means actuated from the main drive shaft, to control the operation of the release member, whereby the lock for the zero setting member is disengaged near the beginning of the zero-setting operation of each order wheel; means to arrest the order wheels in their zero positions; and differentially adjustable selecting means controlled by the zero setting member as to extent of adjustment, to trip the selected value typing levers for operation, the differentially adjustable means including a shiftable selecting device; trip elements individual to the several value typing levers and interposed between the selecting device and the value typing levers for selection by the selecting device; and means actuated in timed relation with the zero setting member to render the selected element effective to trip the proper value typing lever.

4. In a power-driven typewriting-accounting machine, the combination with a travelling carriage; a register having a plurality of order wheels; a master actuator between which and the order wheels there is relative axial movement, to enable the engagement of the master actuator with successive order wheels; a power drive; and power-driven value typing levers; of means to reset the order wheels successively to zero, including a zero resetting member and connections with the master actuator; means to arrest the order wheels in their zero positions; means to operate the zero resetting member; adjustable selecting means controlled as to extent of adjustment, by the order wheel being reset, and through the zero resetting member, the adjustable selecting means including tappets individual to the several value typing levers; a swinging frame; trip members mounted on the frame, and likewise individual to, and interposed between, the several tappets and the several value typing levers; and means operable in timed relation with the resetting of the order wheels to zero, to rock the swinging frame to engage a trip member with its selected tappet to cause the trip member to effect the engagement of its corresponding value typing lever with the power drive therefor.

5. In a power-driven typewriting-accounting machine, the combination with a travelling carriage; a register having a plurality of order wheels; a master actuator, between which and the order wheels there is relative axial movement, to enable engagement of the master actuator with successive order wheels; a motor; a drive shaft operated by the motor; value typing levers; and motor-driven means to actuate the value typing levers; of stop elements individual to the order wheels; a normally idle zero stop shiftable to effective position to coact with each stop element to arrest the order wheels successively in their zero positions; a zero resetting member and connections with the master actuator to reset successive order wheels to zero; means operable by the drive shaft to control the operation of the zero resetting member; adjustable value typing lever-selecting means controlled as to extent of adjustment by the order wheel being reset, through the zero resetting member, the adjustable selecting means including tappets individual to the respective value typing levers; a shiftable support; means actuated by the drive shaft to shift the support in timed relation with the actuation of the zero resetting member; and trip members for the value typing levers, likewise individual to, and interposed between, their respective tappets and the associated value typing levers, each trip member being mounted on the support for relative independent operation, to contact its associated tappet, upon initial shift of the support, after such tappet has been located by operation of the zero setting member in the path of travel of the trip member, to effect engagement of the corresponding value typing lever with the motor-driven actuating means.

6. In a power-driven typewriting-accounting machine, the combination with a travelling carriage; a register having a plurality of order wheels; a master actuator, between which and the order wheels there is relative axial movement, to enable engagement of the master actuator with successive order wheels; a motor; a drive shaft operated by the motor; value typing levers; and motor-driven means to actuate the value typing levers; of stop elements individual to the order wheels; a normally idle zero stop shiftable to effective position to coact with each stop element to arrest the order wheels successively in their zero positions; a zero resetting member and connections with the master actuator to reset successive order wheels to zero; means operable by the drive shaft to control the operation of the zero resetting member; means to effect the engagement selectively of the value typing levers with their motor-driven actuating means, including a differentially adjustable selecting member; a driving connection between the selecting member and the zero resetting member; relatively spaced tappets, individual to the respective value typing levers, and singly located by the selecting member in effective position according to the extent of travel of the zero setting member in returning an order wheel to zero; a spring to actuate the zero setting member and the selecting member under control of the drive shaft; a shiftable support; means controlled by the drive shaft to shift the support in timed relation with the resetting of each order wheel to zero; and trip members individual to the tappets and the value typing levers, and mounted on the support for bodily movement therewith to contact the appropriate trip member with the tappet set to effective position under control of the order wheel at that time in operative relation to the master actuator, such contact of the trip member with its corresponding tappet being effective to cause the trip member to trip its associated value typing lever for operation by its motor-driven actuating means.

7. In a power-driven typewriting-accounting machine, the combination with a travelling carriage; a register having a plurality of order wheels; a master actuator with which the order wheels engage successively; a motor; a drive shaft operated by the motor; value typing levers; and motor-driven means to actuate the typing levers; of means to clear the order wheels and print a total, including a zero setting member; a value typing lever-selecting means in train with the zero setting member; a shiftable gear in train with the master actuator and normally out of engagement with the zero setting member; latching means to hold the zero setting member in normal position; a release member to disengage the latching means; means operable under control of the release member to engage the gear and the zero setting member to enable the zero setting member to restore the active order wheel to zero, and to set the selecting means under control of the order wheel; means to arrest the order wheels at their zero positions; means operated by the drive shaft to control the operation of the release member and of the zero setting member; the selecting means including spaced tappets individual to the respective value typing levers; normally idle tripping devices for the respective value typing levers, and individual to the respective tappets; and means controlled by the drive shaft in timed relation with the setting of the selecting means, to effect a coaction between the selected tappet and its corresponding tripping device to cause the tripping device to engage its value typing lever with the motor-driven means for actuating the typing lever.

8. In a power-driven typewriting-accounting machine, the combination with a travelling carriage; a register having a plurality of order wheels; a master actuator with which the order wheels engage successively; a motor; a drive shaft operated by the motor; value typing levers; and motor-driven means to actuate the typing levers; of means to clear the order wheels and print a total, including a zero setting member; a value typing lever-selecting means in train with the zero setting member; a shiftable gear in train with the master actuator and normally out of engagement with the zero setting member; a spring to yieldingly retain the shiftable gear ineffective; a release member; means operable by the drive shaft to control the operation of the release member from and to its normal position at each cycle of the machine; means operable by the release member to control the operation of the zero setting member from and to its normal position at each cycle of the machine; means operable by the release member to effect engagement of the gear and the zero setting member prior to the operation of the zero setting member, to enable the zero setting member to restore the order wheels to zero as the wheels successively engage the master actuator and to variously set the selecting means under control of the order wheels; means to retain the gear and the zero setting member engaged until near the end of each machine cycle; means to arrest the order wheels in their zero positions; the value typing lever-selecting means including spaced tappets individual to the respective value typing levers, and shiftable singly into and out of effective position; normally idle tripping devices for the respective value typing levers, and individual to the respective tappets; means operable by the drive shaft in timed relation with the setting of the selecting means to effect a coaction between the selected tappet in effective position and its corresponding tripping device, to cause the tripping device to connect its value typing lever with the motor-driven means for actuating the typing levers; and means operable by the drive shaft to render ineffective the means which retains the gear and zero setting member engaged, to enable the spring to return the gear to its ineffective position prior to the return of the zero setting member to its normal position.

9. In a power-driven typewriting-accounting machine, having a travelling carriage, the combination with a register having a plurality of order wheels; a master actuator with which the order wheels engage successively; a motor; a drive shaft operated by the motor; value typing levers; and motor-driven means to actuate the typing levers; of means to automatically clear the order wheels, one by one, including a zero setting member; a transmission means between the master actuator and the zero setting member having a normally ineffective connection; latching means to hold the zero setting member in normal position; a release member to disengage the latching means; means operable by the drive shaft to control the operation of the release member; means operable by the release member to render effective the normally ineffective transmission connection prior to operation of the zero setting member, to enable the zero setting member to restore to zero the order wheels as they successively engage the master actuator; means to arrest the order wheels at zero; means to lock the transmission connection in its effective position; means operable by the drive shaft to release the locking means for retaining the transmission connection effective; means likewise operated by the drive shaft to insure the return of the transmission connection to its normal idle position; a selecting means differentially shiftable under control of the zero setting member, including a series of spaced tappets movable singly into and out of effective position, and individual to the respective value typing levers; value typing lever-tripping devices individual to the respective tappets and the value typing levers; means operable by the drive shaft under control of the release member to shift the tripping devices towards the selecting member to engage the appropriate tripping device with the tappet which is in effective position, whereby the tripping device effects the engagement of the corresponding value typing lever with the motor-driven actuating means therefor.

10. In a power-driven typewriting-accounting machine, having a travelling carriage, the combination with a register having a plurality of order wheels; a master actuator with which the order wheels engage successively; a motor; a drive shaft operated by the motor; value typing levers; and motor-driven means to actuate the typing levers; of means to automatically clear the order wheels, one by one, and print a total, digit by digit, including a zero setting member; means to latch the zero setting member in its normal position; a shiftable gear in train with the master actuator, and normally out of effective position relatively to the zero setting member; a release member to disengage the latching means; means operable by the release member to shift the gear to effective position relatively to the zero setting member, to enable the zero setting member to restore the order wheels to zero; means operable by the drive shaft to impart a travel of constant extent to the release member; the zero setting member having a variable extent of travel depending upon the values of the digits represented by the order wheels; a yielding drive to shift the zero setting member in a direction to restore the order wheels to zero; means operable by the release member to restore the zero setting member to normal position; a special key to initiate repeated cycles of the machine; zero stop means successively controlled by the special key and by the release member to arrest the order wheels in their zero positions; a value typing lever-selecting member in train with the zero setting member for variable adjustment in accordance with the extent of travel of the zero setting member, as determined by the value registered on the order wheels reset to zero, the selecting member including a plurality of spaced tappets movable singly and successively into and out of effective position, and individual to the respective value typing levers; value typing lever-tripping devices individual to the respective tappets and to the value typing levers; means operated by the drive shaft under control of the release member to shift the tripping devices towards the selecting member to engage the appropriate tripping device with the tappet which is in effective position, whereby the tripping device is caused to effect the engagement of the corresponding value typing lever with the motor-driven actuating means therefor.

11. In a power-driven typewriting-accounting machine, having a travelling carriage, the combination with a register having a plurality of order wheels; a master actuator with which the order wheels engage successively; a motor; a drive shaft operated by the motor; value typing levers; and motor-driven means to actuate the typing levers; of means to automatically clear the order wheels and to print, one by one, the digits representing a total, including a zero setting member; means to shift the zero resetting member in one direction; transmitting mechanism between the zero setting member and the master actuator, including a normally ineffective connection; latching means to retain the zero setting member in normal position; a release member to disengage the latching means; means operable by the drive shaft to control the movement of the release member; a special key to initiate repeated cycling of the machine; means controlled by the special key and by the release member to arrest the order wheels in their zero positions; means operable by the release member to render effective the normally ineffective connection between the zero setting member and the master actuator, to enable the zero setting member, under the influence of its shifting means, to restore to zero the order wheels, one by one, as they engage the master actuator; selecting means differentially shiftable under control of the zero setting member as determined by the order wheels, including a series of spaced tappets shiftable into and out of effective position, and individual to the respective value typing levers; a shiftable support; a series of value typing lever-tripping devices journaled for relative independent movement on the support, the tripping devices being individual to the respective tappets and their value typing levers; means operable by the drive shaft at each machine cycle, to shift the support to cause the tripping device associated with the tappet set to effective position, to strike said tappet and thereafter shift on the support to effect engagement of the corresponding value typing lever with the motor driven actuating means therefor, said last-named drive shaft-operated means including a normally ineffective coupling; and means controlled by the release member to shift the coupling to effective position.

12. In a power-driven typewriting-accounting machine, having a travelling carriage, the combination with a register having a plurality of order wheels; a master actuator with which the order wheels engage successively; a motor; a drive shaft operated by the motor; value typing levers; and motor-driven means to actuate the typing levers; of means to automatically clear the order wheels, one by one, and print the digits, one by one, including a selecting mechanism for the value typing levers, differentially positioned under control of the successive order wheels, and comprising a differentially shiftable zero setting member; means to shift the zero setting member in one direction; a transmission train between the master actuator and the zero setting member, including a normally ineffective connection; a release member having a constant extent of travel; means operable by the release member to render the connection effective, to enable the zero setting member to restore the order wheels to zero as they are engaged with the master actuator; means to arrest the order wheels in their zero positions; means operated by the drive shaft to control the operation of the release member; transmission means between the zero setting member and the selecting mechanism; the selecting mechanism including a plurality of spaced tappets individual to the respective value typing levers, and shiftable successively into and out of effective position; value typing lever-tripping devices individual to the respective tappets and to the value typing levers; a shiftable support on which the tripping devices are mounted for independent movement relatively to each other; normally ineffective means operable by the drive shaft to shift the support; and idle means controlled by the release member to couple the support and its shifting means, whereby the support and its tripping devices are moved towards the tappets to cause that tripping device, corresponding with the tappet which has been brought to effective position, to contact the tappet, further movement of the support causing said tripping device to effect engagement of its associated value typing lever with the motor-driven actuator therefor.

13. In a power-driven typewriting-accounting machine, having a travelling carriage, the combination with a register having a plurality of order wheels; a master actuator with which the order wheels engage successively; a motor; a drive shaft operated by the motor; value typing levers; and motor-driven means to actuate the typing levers; of means to automatically clear the order wheels, one by one, as they successively engage with the master actuator, including stops associated with the respective order wheels; a normally idle zero stop to coact with the first-named stops to arrest the order wheels in their zero positions; a zero setting member capable of excursions of variable extent; transmission means between the zero setting member and the master actuator, including a normally ineffective connection; a release member; normally idle means operable by the drive shaft to control the operation of the release member, and the zero setting member; means to connect the drive shaft and said control means for effecting repeated cycles of the machine, and to advance the zero stop from its idle position part way towards its effective position; means controlled by the release member upon each machine cycle, to advance the zero stop from its partially advanced position to its effective position relatively to the stops associated with the order wheels, and to free the zero stop for return to its partially advanced position prior to the completion of each machine cycle; means also operable by the release member to render effective the normally ineffective connection in the transmission means between the zero stop and the master actuator to enable the zero setting member to restore to zero the order wheels, one by one, as they engage with the master actuator; selecting means differentially shiftable under control of the zero setting member as determined by the order wheels, including a plurality of spaced tappets successively shiftable into and out of effective position, and individual to the respective value typing levers; a corresponding plurality of value typing lever-tripping devices; a shiftable support on which the tripping devices are mounted for relative movement; and drive shaft-operated means to shift the support to bring that tripping device corresponding with the particular tappet in effective position, into contact with said tappet to cause the tripping device, upon further movement of the shiftable support, to effect engagement of its associated value typing lever with the motor-driven actuating means.

14. In an automatic clearing and total printing mechanism for a power typewriting-accounting machine, the combination with a travelling carriage; a register having a plurality of order wheels on which items are accumulated; a master actuator engageable with successive order wheels; a motor; and a drive shaft operated thereby; of means to clear the wheels successively in denominational order, including a zero setting member capable of differential travel from its normal position, under control of an order wheel; a transmission between the zero setting member and the master actuator, a normally ineffective connection in the transmission; a release member; means operable by the drive shaft to confine the release member to excursions of constant extent; means controlled by the release member to render effective the normally ineffective connection; means operable by the drive shaft to enable the return of the connection to its ineffective position; and means operable by the release member to restore the zero setting member to normal position subsequently to the return of the connection to its ineffective condition.

15. In an automatic clearing and total printing mechanism for a power typewriting-accounting machine, the combination with a travelling carriage; a register having a plurality of order wheels on which items are accumulated; a master actuator engageable with successive order wheels; a motor; and a drive shaft operated thereby; of means to clear the wheels successively in denominational order, including a zero setting member capable of differential travel from its normal position, under control of an order wheel; a transmission between the zero setting member and the master actuator; means to advance the zero setting member in a direction to reset to zero the order wheel engaged with the master actuator; a stop associated with each order wheel, normally idle means shiftable into the paths of such stops to arrest the order wheels in their zero positions; a power-driven release member; means operable by the release member to restore the zero setting means to its normal position; means operable incident to conditioning the machine for clearing and total printing, to advance the order wheel arresting means part way towards its effective position in the paths of the stops; and means operable by the release member at each cycle to complete the movement of the arresting means to effective position prior to the advance of the zero setting member and to release the arresting means for return to its intermediate position prior to the return of the zero setting member to normal position.

16. In an automatic clearing and total printing mechanism for a power typewriting-accounting machine, the combination with a travelling carriage; a register having a plurality of order wheels on which items are accumulated; a master actuator engageable with successive order wheels; a motor; and a drive shaft operated thereby; of means to clear the wheels successively in denominational order, including a zero setting member capable of differential travel from its normal position, under control of an order wheel; a normally ineffective transmission between the zero setting member and the master actuator; a release member having a travel of constant extent; means operable by the drive shaft to control the extent of travel of the release member; means controlled by the release member to render the transmission effective; a selecting mechanism connected with the zero setting member for differential movement coincident therewith, the selecting means including a plurality of spaced tappets shiftable successively into and out of effective position; a corresponding plurality of value typing levers, each tappet being individual to its respective value typing lever; motor-driven means engageable by the value typing levers to effect printing of the corresponding digits; a plurality of tripping devices also individual to the respective value typing levers and to the tappets; a shiftable support on which the tripping devices are mounted for relative independent movement; means operated by the drive shaft, and including a normally disengaged coupling, to shift the support to bring that tripping device corresponding to the tappet in effective position, into contact with such tappet, continued shifting of support operating to cause the tripping device to effect the engagement of its associated value typing lever with the motor-driven actuating means therefor; means controlled by the release member to temporarily engage the normally disengaged coupling; and means operable by the release member to restore the zero setting member to normal.

ROBERT ANSCHÜTZ.